United States Patent
Takemori et al.

(10) Patent No.: US 10,855,460 B2
(45) Date of Patent: Dec. 1, 2020

(54) IN-VEHICLE COMPUTER SYSTEM, VEHICLE, KEY GENERATION DEVICE, MANAGEMENT METHOD, KEY GENERATION METHOD, AND COMPUTER PROGRAM

(71) Applicant: KDDI CORPORATION, Tokyo (JP)

(72) Inventors: Keisuke Takemori, Tokyo (JP);
Seiichiro Mizoguchi, Tokyo (JP);
Hideaki Kawabata, Tokyo (JP);
Ayumu Kubota, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 217 days.

(21) Appl. No.: 16/068,804

(22) PCT Filed: Jan. 5, 2017

(86) PCT No.: PCT/JP2017/000105
§ 371 (c)(1),
(2) Date: Jul. 9, 2018

(87) PCT Pub. No.: WO2017/126322
PCT Pub. Date: Jul. 27, 2017

(65) Prior Publication Data
US 2019/0028267 A1   Jan. 24, 2019

(30) Foreign Application Priority Data

Jan. 18, 2016   (JP) ................................ 2016-007432
Jul. 29, 2016   (JP) ................................ 2016-150269

(51) Int. Cl.
*H04L 9/08*   (2006.01)
*G06F 21/44*   (2013.01)
(Continued)

(52) U.S. Cl.
CPC ............... *H04L 9/088* (2013.01); *G06F 7/48* (2013.01); *G06F 21/31* (2013.01); *G06F 21/44* (2013.01);
(Continued)

(58) Field of Classification Search
CPC ..... H04L 9/088; H04L 9/0877; H04L 9/3242; H04L 9/0866; H04L 2209/84;
(Continued)

(56) References Cited

U.S. PATENT DOCUMENTS 9,132,790 B2   9/2015   Miyake
9,792,440 B1 *   10/2017   Wang ...................... G06F 21/44
(Continued)

FOREIGN PATENT DOCUMENTS

CN   104580351 A   4/2015
JP   2009-111974 A   5/2009
(Continued)

OTHER PUBLICATIONS

Ueda, Hiroshi et al., "Security Authentication System for In-Vehicle Network", SEI Technical Review • No. 81 • Oct. 2015, pp. 5-9. (Year: 2015).*

(Continued)

*Primary Examiner* — Michael Pyzocha
(74) *Attorney, Agent, or Firm* — Greenblum & Bernstein, P.L.C.

(57) ABSTRACT

In a secure hardware extension (SHE)-B, an initial key is set to a KEY_N key usable in a verification process and a generation process for a message authentication code. In an SHE-A, a master key is set to a KEY_N key usable in the verification process and the generation process for the message authentication code, the master key being used together with an identifier of an authenticated electronic control unit (ECU) for generating the message authentica-
(Continued)

tion code to be used as the initial key. A central processing unit (CPU) causes the message authentication code for the identifier of the authenticated ECU to be generated using the master key through the SHE-A and executes a process of authenticating validity of the authenticated ECU by using the generated message authentication code.

15 Claims, 18 Drawing Sheets

(51) Int. Cl.
| | |
|---|---|
| G09C 1/00 | (2006.01) |
| G06F 21/64 | (2013.01) |
| H04L 9/32 | (2006.01) |
| G06F 7/48 | (2006.01) |
| G06F 21/31 | (2013.01) |

(52) U.S. Cl.
CPC .............. *G06F 21/64* (2013.01); *G09C 1/00* (2013.01); *H04L 9/0866* (2013.01); *H04L 9/0877* (2013.01); *H04L 9/3242* (2013.01); H04L 2209/84 (2013.01)

(58) Field of Classification Search
CPC .......... G06F 21/64; G06F 21/44; G06F 21/31; G06F 7/48; G09C 1/00
See application file for complete search history.

(56) References Cited

U.S. PATENT DOCUMENTS

| | | | |
|---|---|---|---|
| 2009/0099967 A1 | 4/2009 | Yokota et al. | |
| 2014/0114497 A1* | 4/2014 | Miyake | H04L 9/3271 701/1 |
| 2014/0301550 A1* | 10/2014 | Lewis | H04L 9/3226 380/259 |
| 2015/0084753 A1* | 3/2015 | Biondo | B60R 25/246 340/426.11 |
| 2015/0263860 A1* | 9/2015 | Leboeuf | H04W 12/08 713/171 |
| 2016/0173505 A1* | 6/2016 | Ichihara | H04L 67/12 713/170 |
| 2016/0173530 A1* | 6/2016 | Miyake | H04L 67/12 726/3 |
| 2016/0297401 A1* | 10/2016 | Haga | H04L 9/0891 |
| 2016/0315766 A1* | 10/2016 | Ujiie | H04L 63/068 |
| 2017/0111177 A1* | 4/2017 | Oguma | H04L 9/3273 |
| 2017/0139795 A1* | 5/2017 | Komano | H04L 63/08 |
| 2017/0142123 A1* | 5/2017 | Komano | H04L 9/0825 |
| 2017/0149562 A1* | 5/2017 | Takada | B60R 16/023 |
| 2017/0324558 A1* | 11/2017 | Takemori | H04L 9/0891 |
| 2018/0076958 A1* | 3/2018 | Narimoto | H04L 9/0877 |
| 2018/0270052 A1* | 9/2018 | Cullen | H04L 9/0827 |
| 2019/0007215 A1* | 1/2019 | Hakuta | H04L 63/123 |

FOREIGN PATENT DOCUMENTS

| | | |
|---|---|---|
| JP | 2012-186635 A | 9/2012 |
| WO | 2013/005730 A1 | 1/2013 |

OTHER PUBLICATIONS

Takemori, Keisuke, "Automotive Security Using Secure Element", KDDI, 2015 pp. 1-27. (Year: 2015).*

Keisuke Takemori, "In-vehicle Network Security Using Secure Elements—Discussion of Security Technologies ", IEICE Technical Report, vol. 114, No. 508, with English Abstract , May 2015, pp. 73-78.

"STMicroelectronics", Internet URL: http://www.st.com/web/en/resource/technical/document/application_Note/MD0075575.pdf, Sep. 2013.

"Body Gateway Muke On-Chip Security Kino Tosai 32 Bit Maikon", freescale [online], Jan. 2014, [retrieval date Mar. 16, 2017] Internet URL: http://www.nxp.com/assetsts/documentsk/date/en/supporting_information/E_SecurityMCU_JA.dpf, Jan. 2014.

Keisuke Takemori, "Secure Element o Kiten to shita Shasai Seigyo System no Hogo-Yoso Gijutsu no Seiri to Kotatsu-, Dai 17 Kai Kumikomi System Gijutsu ni Kansuru Summer workshop (SWEST17/) [online], ", 28{retrieval date Mar. 16, 2017, Internet: https://swest.toppers.jp/SWEST17/data/s3a_proceeding.pdf, Session (s3) S3a, Aug. 28, 2015.

Geoff Emerson et al., "Using the Cryptographic Service Engine(CSE), Freescale Semiconductor Application Note", [retrieval date Mar. 16, 2017], Internet URL http://cache.freescale.com/files/32bit/doc/app_note/AN4234.pdf, Number: AN4234 Rev.0, Jun. 2011.

Hiroshi Ueda et al., "Security Authentication System for in-Vehicle Network", SEI Technical review, Sumitomo Electric Industries, No. 187 , Jul. 31, 2015, pp. 1-5.

International Search Report issued in WIPO Patent Application No. PCT/JP2017/000105, dated Apr. 4, 2017.

Office Action issued in JAPANESE family member Patent Appl. No. 2016-150269, dated Apr. 11, 2017 , along with an English translation thereof.

Keisuke Takemori et al., "Key Managements for ECU and Code Authentications Using Tamper-resistant Secure Element", IEICE Technical Report, Dec. 10, 2015 (Dec. 10, 2015), vol. 115.

Notice of Allowance issued in JAPANESE Patent Application No. 2017-197250, dated Nov. 20, 2018, along with an English translation thereof.

China Office Action (including English Language Translation of the China Search Report), dated Sep. 21, 2020, for China Application No. 201780007461.3.

\* cited by examiner

IN-VEHICLE COMPUTER SYSTEM, VEHICLE, KEY GENERATION DEVICE, MANAGEMENT METHOD, KEY GENERATION METHOD, AND COMPUTER PROGRAM

TECHNICAL FIELD

The present invention relates to an in-vehicle computer system, a vehicle, a key generation device, a management method, a key generation method, and a computer program.

Priority is claimed on Japanese Patent Application No. 2016-007432, filed Jan. 18, 2016 and Japanese Patent Application No. 2016-150269, filed Jul. 29, 2016, the contents of which are incorporated herein by reference.

BACKGROUND ART

Conventionally, a car has an electronic control unit (ECU), and implements a function such as engine control through the ECU. The ECU is a type of computer and implements a desired function through a computer program. For example, security technology for an in-vehicle control system configured by connecting a plurality of ECUs to a controller area network (CAN) is described in Non-Patent Literature 1.

CITATION LIST

Non-Patent Literature

[Non-Patent Literature 1]
Keisuke Takemori, "In-vehicle Network Security Using Secure Elements—Discussion of Security Technologies—", IEICE Technical Report, vol. 114, no. 508, pp. 73 to 78, March 2015

[Non-Patent Literature 2]
STMicroelectronics, "AN4240 Application Note", September 2013, Internet <URL: http://www.st.com/web/en/resource/technical/document/application_note/DM00075575.pdf>

SUMMARY OF INVENTION

Technical Problem

An ECU includes a cipher processing chip, and the cipher processing chip executes an encryption process, thereby improving the security of data in an in-vehicle control system. However, there is a possibility that the security of data will not be sufficiently maintained according to a type of cipher processing chip provided in the ECU.

The present invention has been made in consideration of such circumstances, and an objective of the present invention is to provide an in-vehicle computer system, a vehicle, a management method, and a computer program capable of improving the security of data in an in-vehicle control system by executing a cipher processing procedure according to a cipher processing chip provided in an in-vehicle computer such as an ECU.

Also, an objective of the present invention is to provide a key generation device, a key generation method, and a computer program capable of flexibly generating a key stored in an in-vehicle computer.

Solution to Problem (1) According to an aspect of the present invention, there is provided an in-vehicle computer system provided in a vehicle, the in-vehicle computer system including: a first in-vehicle computer including a first arithmetic processing device, a first secure hardware extension (SHE), and a first storage unit; and a second in-vehicle computer including a second arithmetic processing device, a second SHE, and a second storage unit, wherein the first in-vehicle computer and the second in-vehicle computer are connected to a communication network provided in the vehicle, wherein an initial key is set to a KEY_N key usable in a generation process and a verification process for a message authentication code in the second SHE, wherein a master key is set to a KEY_N key usable in the generation process and the verification process for the message authentication code in the first SHE, the master key being used together with an identifier of the second in-vehicle computer for generating the message authentication code to be used as the initial key, wherein the first arithmetic processing device is configured to cause the message authentication code for the identifier of the second in-vehicle computer received from the second in-vehicle computer to be generated using the master key through the first SHE, and wherein the first arithmetic processing device is further configured to execute a process of authenticating validity of the second in-vehicle computer by using the generated message authentication code.

(2) According to an aspect of the present invention, in the in-vehicle computer system of the above (1), the first arithmetic processing device is further configured to cause a MASTER_ECU_KEY (MEK) key of the second SHE to be generated using the master key through the first SHE, the first arithmetic processing device is further configured to cause a key registration message for registering a key exchange key in another KEY_N key usable in an encryption process and a decryption process of the second SHE or the KEY_N key usable in the generation process and the verification process for the message authentication code of the second SHE to be generated using the MEK key through the first SHE and transmits the key registration message to the second in-vehicle computer, and the second arithmetic processing device is configured to register the key exchange key in the second SHE according to the key registration message.

(3) According to an aspect of the present invention, in the in-vehicle computer system of the above (2), the first arithmetic processing device is further configured to cause a key registration message for registering a message authentication code (MAC) key in a RAM_KEY key of the second SHE to be generated using the key exchange key through the first SHE and transmit the key registration message to the second in-vehicle computer, and the second arithmetic processing device is further configured to register the MAC key in the second SHE according to the key registration message.

(4) According to an aspect of the present invention, in the in-vehicle computer system of the above (3), the second storage unit stores the key registration message for registering the MAC key in the RAM_KEY key of the second SHE in a non-volatile memory, the second arithmetic processing device is further configured to register the MAC key in the second SHE according to the key registration message stored in the non-volatile memory, and the first in-vehicle computer and the second in-vehicle computer are further configured to execute a validity authentication process based on the MAC key registered in the RAM_KEY key of the second SHE according to the key registration message stored in the non-volatile memory.

(5) According to an aspect of the present invention, there is provided an in-vehicle computer system provided in a vehicle, the in-vehicle computer system including: a first in-vehicle computer including a first arithmetic processing device, a hardware security module (HSM), and a first storage unit; and a second in-vehicle computer including a second arithmetic processing device, a secure hardware extension (SHE), and a second storage unit, wherein the first in-vehicle computer and the second in-vehicle computer are connected to a communication network provided in the vehicle, wherein an initial key is set to a KEY_N key usable in a generation process and a verification process for a message authentication code in the SHE, wherein a master key is stored in the HSM, the master key being used together with an identifier of the second in-vehicle computer for generating the message authentication code to be used as the initial key, wherein the first arithmetic processing device is configured to cause the message authentication code for the identifier of the second in-vehicle computer received from the second in-vehicle computer to be generated using the master key through the HSM, and wherein the first arithmetic processing device is further configured to execute a process of authenticating validity of the second in-vehicle computer by using the generated message authentication code.

(6) According to an aspect of the present invention, in the in-vehicle computer system of the above (5), the first arithmetic processing device is further configured to cause a MASTER_ECU_KEY (MEK) key of the SHE to be generated using the master key through the HSM, the first arithmetic processing device is further configured to cause a key registration message for registering a key exchange key in another KEY_N key usable in an encryption process and a decryption process of the SHE or the KEY_N key usable in the generation process and the verification process for the message authentication code of the SHE to be generated using the MEK key through the HSM and transmit the key registration message to the second in-vehicle computer, and the second arithmetic processing device is configured to register the key exchange key in the SHE according to the key registration message.

(7) According to an aspect of the present invention, in the in-vehicle computer system of the above (6), the first arithmetic processing device is further configured to cause a key registration message for registering a message authentication code (MAC) key in a RAM_KEY key of the SHE to be generated using the key exchange key through the HSM and transmit the key registration message to the second in-vehicle computer, and the second arithmetic processing device is further configured to register the MAC key in the SHE according to the key registration message.

(8) According to an aspect of the present invention, in the in-vehicle computer system of the above (7), the second storage unit stores the key registration message for registering the MAC key in the RAM_KEY key of the SHE in a non-volatile memory, the second arithmetic processing device is further configured to register the MAC key in the SHE according to the key registration message stored in the non-volatile memory, and the first in-vehicle computer and the second in-vehicle computer are further configured to execute a validity authentication process based on the MAC key registered in the RAM_KEY key of the SHE according to the key registration message stored in the non-volatile memory.

(9) According to an aspect of the present invention, there is provided an in-vehicle computer system provided in a vehicle, the in-vehicle computer system including: a first in-vehicle computer including a first arithmetic processing device, a first secure hardware extension (SHE), and a first storage unit; and a second in-vehicle computer including a second arithmetic processing device, a second SHE, and a second storage unit, wherein the first in-vehicle computer and the second in-vehicle computer are connected to a communication network provided in the vehicle, wherein an initial key is set to a KEY_N key usable in a generation process and a verification process for a message authentication code in the second SHE, wherein the first arithmetic processing device is configured to cause the message authentication code for an identifier of the second in-vehicle computer received from the second in-vehicle computer to be generated through a secure element storing a master key used together with the identifier of the second in-vehicle computer for generating the message authentication code to be used as the initial key, and wherein the first arithmetic processing device is further configured to cause the secure element to execute a process of authenticating validity of the second in-vehicle computer using the generated message authentication code.

(10) According to an aspect of the present invention, in the in-vehicle computer system of the above (9), the first arithmetic processing device is further configured to cause a MASTER_ECU_KEY (MEK) key of the second SHE to be generated using the master key through the secure element, the first arithmetic processing device is further configured to cause a key registration message for registering a key exchange key in another KEY_N key usable in an encryption process and a decryption process of the second SHE or the KEY_N key usable in the generation process and the verification process for the message authentication code of the second SHE to be generated using the MEK key through the secure element and transmit the key registration message to the second in-vehicle computer, and the second arithmetic processing device is configured to register the key exchange key in the second SHE according to the key registration message.

(11) According to an aspect of the present invention, there is provided an in-vehicle computer system provided in a vehicle, the in-vehicle computer system including: a first in-vehicle computer including a first arithmetic processing device, a hardware security module (HSM), and a first storage unit; and a second in-vehicle computer including a second arithmetic processing device, a secure hardware extension (SHE), and a second storage unit, wherein the first in-vehicle computer and the second in-vehicle computer are connected to a communication network provided in the vehicle, wherein an initial key is set to a KEY_N key usable in a generation process and a verification process for a message authentication code in the SHE, wherein the first arithmetic processing device is configured to cause the message authentication code for an identifier of the second in-vehicle computer received from the second in-vehicle computer to be generated through a secure element storing a master key used together with the identifier of the second in-vehicle computer for generating the message authentication code to be used as the initial key, and wherein the first arithmetic processing device is further configured to cause the secure element to execute a process of authenticating validity of the second in-vehicle computer using the generated message authentication code.

(12) According to an aspect of the present invention, in the in-vehicle computer system of the above (11), the first arithmetic processing device is further configured to cause a MASTER_ECU_KEY (MEK) key of the SHE to be generated using the master key through the secure element, the first arithmetic processing device is further configured to cause a key registration message for registering a key exchange key in another KEY_N key usable in an encryption process and a decryption process of the SHE or the KEY_N key usable in the generation process and the verification process for the message authentication code of the SHE to be generated using the MEK key through the secure element and transmit the key registration message to the second in-vehicle computer, and the second arithmetic processing device is configured to register the key exchange key in the SHE according to the key registration message.

(13) According to an aspect of the present invention, there is provided a vehicle including the in-vehicle computer system according to any one of the above (1) to (12).

(14) According to an aspect of the present invention, there is provided a management method for use in an in-vehicle computer system provided in a vehicle, the management method including: a message authentication code generation step; and an authentication step, wherein the in-vehicle computer system includes a first in-vehicle computer including a first arithmetic processing device, a first secure hardware extension (SHE), and a first storage unit; and a second in-vehicle computer including a second arithmetic processing device, a second SHE, and a second storage unit, wherein the first in-vehicle computer and the second in-vehicle computer are connected to a communication network provided in the vehicle, wherein an initial key is set to a KEY_N key usable in a generation process and a verification process for a message authentication code in the second SHE, wherein a master key is set to a KEY_N key usable in the generation process and the verification process for the message authentication code in the first SHE, the master key being used together with an identifier of the second in-vehicle computer for generating the message authentication code to be used as the initial key, wherein, in the message authentication code generation step, the first arithmetic processing device causes the message authentication code for the identifier of the second in-vehicle computer received from the second in-vehicle computer to be generated using the master key through the first SHE, and wherein, in the authentication step, the first arithmetic processing device executes a process of authenticating validity of the second in-vehicle computer by using the generated message authentication code.

(15) According to an aspect of the present invention, there is provided a management method for use in an in-vehicle computer system provided in a vehicle, the management method including: a message authentication code generation step; and an authentication step, wherein the in-vehicle computer system includes a first in-vehicle computer including a first arithmetic processing device, a hardware security module (HSM), and a first storage unit; and a second in-vehicle computer including a second arithmetic processing device, a secure hardware extension (SHE), and a second storage unit, wherein the first in-vehicle computer and the second in-vehicle computer are connected to a communication network provided in the vehicle, wherein an initial key is set to a KEY_N key usable in a generation process and a verification process for a message authentication code in the SHE, wherein a master key is stored in the HSM, the master key being used together with an identifier of the second in-vehicle computer for generating the message authentication code to be used as the initial key, wherein, in the message authentication code generation step, the first arithmetic processing device causes the message authentication code for the identifier of the second in-vehicle computer received from the second in-vehicle computer to be generated using the master key through the HSM, and wherein, in the authentication step, the first arithmetic processing device executes a process of authenticating validity of the second in-vehicle computer by using the generated message authentication code.

(16) According to an aspect of the present invention, there is provided a management method for use in an in-vehicle computer system provided in a vehicle, the management method including: a message authentication code generation step; and an authentication step, wherein the in-vehicle computer system includes a first in-vehicle computer including a first arithmetic processing device, a first secure hardware extension (SHE), and a first storage unit; and a second in-vehicle computer including a second arithmetic processing device, a second SHE, and a second storage unit, wherein the first in-vehicle computer and the second in-vehicle computer are connected to a communication network provided in the vehicle, wherein an initial key is set to a KEY_N key usable in a generation process and a verification process for a message authentication code in the second SHE, wherein, in the message authentication code generation step, the first arithmetic processing device causes the message authentication code for an identifier of the second in-vehicle computer received from the second in-vehicle computer to be generated through a secure element storing a master key used together with the identifier of the second in-vehicle computer for generating the message authentication code to be used as the initial key, and wherein, in the authentication step, the first arithmetic processing device causes the secure element to execute a process of authenticating validity of the second in-vehicle computer using the generated message authentication code.

(17) According to an aspect of the present invention, there is provided a management method for use in an in-vehicle computer system provided in a vehicle, the management method including: a message authentication code generation step; and an authentication step, wherein the in-vehicle computer system includes a first in-vehicle computer including a first arithmetic processing device, a hardware security module (HSM), and a first storage unit; and a second in-vehicle computer including a second arithmetic processing device, a secure hardware extension (SHE), and a second storage unit, wherein the first in-vehicle computer and the second in-vehicle computer are connected to a communication network provided in the vehicle, wherein an initial key is set to a KEY_N key usable in a generation process and a verification process for a message authentication code in the SHE, wherein, in the message authentication code generation step, the first arithmetic processing device causes the message authentication code for an identifier of the second in-vehicle computer received from the second in-vehicle computer to be generated through a secure element storing a master key used together with the identifier of the second in-vehicle computer for generating the message authentication code to be used as the initial key, and wherein, in the authentication step, the first arithmetic processing device causes the secure element to execute a process of authenticating validity of the second in-vehicle computer using the generated message authentication code.

(18) According to an aspect of the present invention, there is provided a computer program for causing a computer serving as a first arithmetic processing device of an in-vehicle computer system provided in a vehicle to execute: a message authentication code generation step; and an authentication step, wherein the in-vehicle computer system includes a first in-vehicle computer including the first arithmetic processing device, a first secure hardware extension (SHE), and a first storage unit; and a second in-vehicle computer including a second arithmetic processing device, a second SHE, and a second storage unit, wherein the first in-vehicle computer and the second in-vehicle computer are connected to a communication network provided in the vehicle, wherein an initial key is set to a KEY_N key usable in a generation process and a verification process for a message authentication code in the second SHE, wherein a master key is set to a KEY_N key usable in the generation process and the verification process for the message authentication code in the first SHE, the master key being used together with an identifier of the second in-vehicle computer for generating the message authentication code to be used as the initial key, wherein, in the message authentication code generation step, the first arithmetic processing device causes the message authentication code for the identifier of the second in-vehicle computer received from the second in-vehicle computer to be generated using the master key through the first SHE, and wherein, in the authentication step, the first arithmetic processing device executes a process of authenticating validity of the second in-vehicle computer by using the generated message authentication code.

(19) According to an aspect of the present invention, there is provided a computer program for causing a computer serving as a first arithmetic processing device of an in-vehicle computer system provided in a vehicle to execute: a message authentication code generation step; and an authentication step, wherein the in-vehicle computer system includes a first in-vehicle computer including the first arithmetic processing device, a hardware security module (HSM), and a first storage unit; and a second in-vehicle computer including a second arithmetic processing device, a secure hardware extension (SHE), and a second storage unit, wherein the first in-vehicle computer and the second in-vehicle computer are connected to a communication network provided in the vehicle, wherein an initial key is set to a KEY_N key usable in a generation process and a verification process for a message authentication code in the SHE, wherein a master key is stored in the HSM, the master key being used together with an identifier of the second in-vehicle computer for generating the message authentication code to be used as the initial key, wherein, in the message authentication code generation step, the first arithmetic processing device causes the message authentication code for the identifier of the second in-vehicle computer received from the second in-vehicle computer to be generated using the master key through the HSM, and wherein, in the authentication step, the first arithmetic processing device executes a process of authenticating validity of the second in-vehicle computer by using the generated message authentication code.

(20) According to an aspect of the present invention, there is provided a computer program for causing a computer serving as a first arithmetic processing device of an in-vehicle computer system provided in a vehicle to execute: a message authentication code generation step; and an authentication step, wherein the in-vehicle computer system includes a first in-vehicle computer including the first arithmetic processing device, a first secure hardware extension (SHE), and a first storage unit; and a second in-vehicle computer including a second arithmetic processing device, a second SHE, and a second storage unit, wherein the first in-vehicle computer and the second in-vehicle computer are connected to a communication network provided in the vehicle, wherein an initial key is set to a KEY_N key usable in a generation process and a verification process for a message authentication code in the second SHE, wherein, in the message authentication code generation step, the first arithmetic processing device causes the message authentication code for an identifier of the second in-vehicle computer received from the second in-vehicle computer to be generated through a secure element storing a master key used together with the identifier of the second in-vehicle computer for generating the message authentication code to be used as the initial key, and wherein, in the authentication step, the first arithmetic processing device causes the secure element to execute a process of authenticating validity of the second in-vehicle computer using the generated message authentication code.

(21) According to an aspect of the present invention, there is provided a computer program for causing a computer serving as a first arithmetic processing device of an in-vehicle computer system provided in a vehicle to execute: a message authentication code generation step; and an authentication step, wherein the in-vehicle computer system includes a first in-vehicle computer including the first arithmetic processing device, a hardware security module (HSM), and a first storage unit; and a second in-vehicle computer including a second arithmetic processing device, a secure hardware extension (SHE), and a second storage unit, wherein the first in-vehicle computer and the second in-vehicle computer are connected to a communication network provided in the vehicle, wherein an initial key is set to a KEY_N key usable in a generation process and a verification process for a message authentication code in the SHE, wherein, in the message authentication code generation step, the first arithmetic processing device causes the message authentication code for an identifier of the second in-vehicle computer received from the second in-vehicle computer to be generated through a secure element storing a master key used together with the identifier of the second in-vehicle computer for generating the message authentication code to be used as the initial key, and wherein, in the authentication step, the first arithmetic processing device causes the secure element to execute a process of authenticating validity of the second in-vehicle computer using the generated message authentication code.

(22) According to an aspect of the present invention, there is provided a key generation device including: a storage unit configured to store a master key; and a calculation unit configured to calculate a key by using the master key stored in the storage unit, an identifier of an in-vehicle computer provided in a vehicle, and a variable indicating a type of key.

(23) According to an aspect of the present invention, there is provided a key generation method including: a storage step in which a key generation device stores a master key in a storage unit; and a calculation step in which the key generation device calculates a key by using the master key stored in the storage unit, an identifier of an in-vehicle computer provided in a vehicle, and a variable indicating a type of key.

(24) According to an aspect of the present invention, there is provided a computer program for causing a computer to execute: a storage step of storing a master key in a storage unit; and a calculation step of calculating a key by using the master key stored in the storage unit, an identifier of an in-vehicle computer provided in a vehicle, and a variable indicating a type of key.

Advantageous Effects of Invention

According to the present invention, it is possible to improve the security of data in an in-vehicle control system by executing a cipher processing procedure according to a cipher processing chip provided in an in-vehicle computer such as an ECU. Also, it is possible to flexibly generate a key stored in the in-vehicle computer.

DESCRIPTION OF EMBODIMENTS

Hereinafter, embodiments of the present invention will be described with reference to the drawings. In the following embodiments, an example in which a car is used as a vehicle will be described.

First Embodiment

Figure 1:
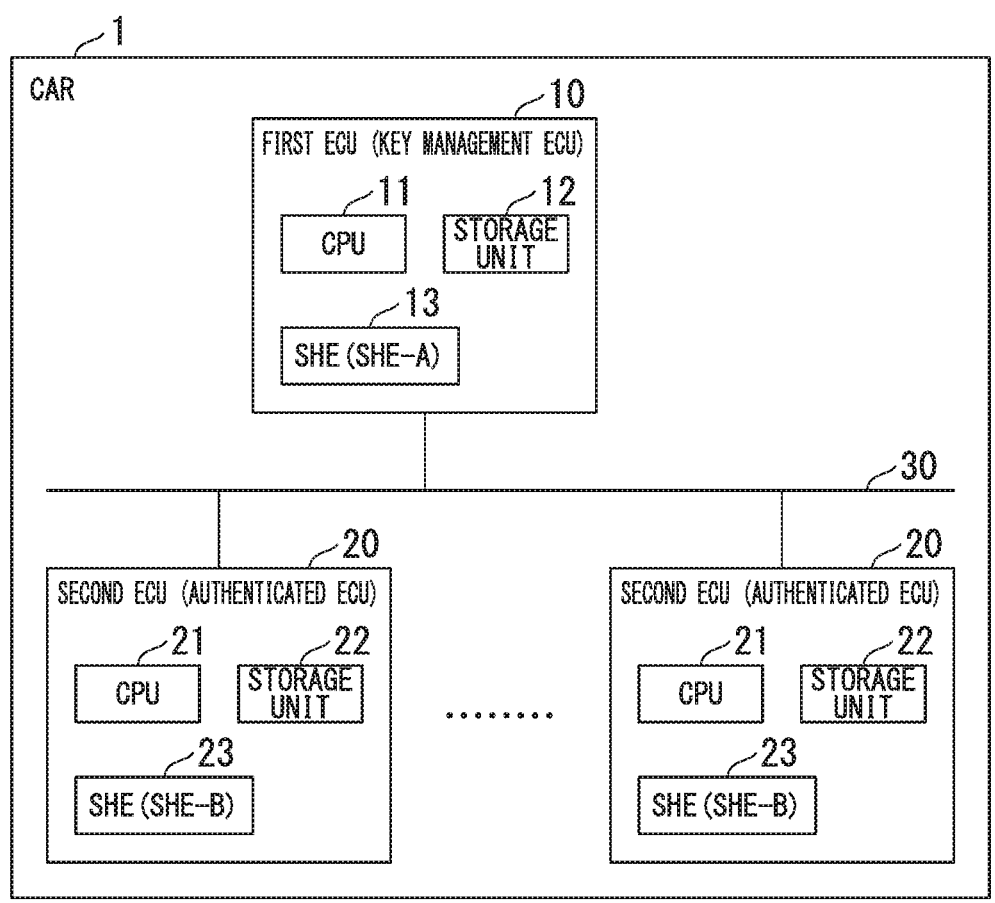
FIG. 1 is a diagram showing a configuration example of an in-vehicle computer system provided in a car according to a first embodiment.

FIG. 1 is a diagram showing a configuration example of an in-vehicle computer system provided in a car 1 according to the present embodiment. In FIG. 1, the in-vehicle computer system provided in the car 1 is configured by connecting a first ECU (electronic control unit) 10 and a plurality of second ECUs 20 to a CAN 30. The in-vehicle computer system can be applied to an in-vehicle control system of the car 1.

The first ECU 10 and the second ECUs 20 are in-vehicle computers provided in the car 1. The first ECU 10 is an ECU having a key management function among ECUs mounted on the car 1. Hereinafter, the first ECU 10 may be referred to as a key management ECU 10.

Each of the second ECUs 20 is an ECU having a function such as engine control among the ECUs mounted on the car 1. Examples of the second ECU 20 include an ECU having an engine control function, an ECU having a steering-wheel control function, an ECU having a brake control function, and the like. The second ECU 20 is an ECU whose validity is authenticated by the first ECU 10. Hereinafter, the second ECU 20 may be referred to as an authenticated ECU 20.

The CAN 30 is a communication network. The CAN is known as one of communication networks installed in vehicles. The first ECU 10 exchanges data with each second ECU 20 via the CAN 30. The second ECU 20 exchanges data with another second ECU 20 via the CAN 30.

Also, as a communication network installed in the vehicle, a communication network other than the CAN may be provided in the car 1, and the exchange of data between the first ECU 10 and the second ECU 20 and the exchange of data between the second ECUs 20 may be performed via a communication network other than the CAN. For example, the car 1 may include a local interconnect network (LIN). Also, the CAN and the LIN may be provided in the car 1. Also, the second ECU 20 connected to the LIN may be provided in the car 1. Also, the first ECU 10 may be connected to the CAN and the LIN. Also, the first ECU 10 may exchange data with the second ECU 20 connected to the CAN via the CAN, and exchange data with the second ECU 20 connected to the LIN via the LIN. Also, the second ECUs 20 may exchange data via the LIN.

The first ECU 10 includes a central processing unit (CPU) 11, a storage unit 12, and a secure hardware extension (SHE) 13. The CPU 11 executes a computer program for implementing the functions of the first ECU 10. The storage unit 12 stores computer programs to be executed by the CPU 11 and various types of data. The SHE 13 has a cipher processing function. The SHE 13 has tamper-resistant properties. The SHE 13 is an example of a secure element (SE). The secure element has tamper-resistant properties. Hereinafter, the SHE 13 may be referred to as an SHE-A 13.

The second ECU 20 includes a CPU 21, a storage unit 22, and an SHE 23. The CPU 21 executes a computer program for implementing the functions of the second ECU 20. The storage unit 22 stores computer programs to be executed by the CPU 21 and various types of data. The SHE 23 has a cipher processing function. The SHE 23 has tamper-resistant properties. The SHE 23 is an example of a secure element. Hereinafter, the SHE 23 may be referred to as an SHE-B 23.

In the following description, the SHE 13 and the SHE 23 will be simply referred to as an SHE unless otherwise distinguished.

[Description of SHE]

In the present embodiment, the first ECU 10 and the second ECUs 20 include an SHE which is an example of a cipher processing chip. Hereinafter, the SHE will be described. The SHE has a cipher processing function. One of cipher processing functions of the SHE is encryption and decryption. One of cipher processing functions of the SHE is generation and verification of a message authentication code (MAC). There is a cipher-based message authentication code (CMAC) as a MAC handled by the SHE.

(Configuration of Keys of SHE)

In the SHE, a plurality of types of keys can be used. The keys of the SHE are a MASTER_ECU_KEY (MEK) key, a BOOT_MAC_KEY (BMK) key, a BOOT_MAC (BM) key, KEY_N keys (where N is any integer between 1 and 10), and a RAM_KEY key. The keys of the SHE will be described below.

(1) MASTER_ECU_KEY (MEK) Key

The MEK key is a key used for updating the MEK key, the BMK key, the BM key, and the KEY_N key. The MEK key cannot be used for an encryption process, a decryption process, and a generation process and a verification process for the MAC. The number of times that the MEK key is rewritten is limited.

(2) BOOT_MAC_KEY (BMK) Key

The BMK key is a key used for calculating the CMAC in secure booting. The BMK key can be used for updating the BMK key and the BM key. The BMK key cannot be used for the encryption process, the decryption process, and the generation process and the verification process for the MAC. The number of times that the BMK key is written is limited.

(3) BOOT_MAC (BM) Key

The BM key is an expected value of the CMAC in secure booting. The BM key cannot be used for the encryption process, the decryption process, and the generation process and the verification process for the MAC. The number of times that the BM key is rewritten is limited.

(4) KEY_N Keys (where N is any integer between 1 and 10)

There are ten keys KEY_1 to KEY_10 as the KEY_N keys. Each KEY_N key can be used in either one of Mode 0 usable for the encryption process and the decryption process and Mode 1 usable for the generation process and the verification process for the MAC. Each KEY_N key can be used for updating only its own key. For example, if the KEY_1 key is used, the KEY_1 key can be updated. The number of times that each KEY_N key is rewritten is limited.

(5) RAM_KEY Key

The RAM_KEY key is a key capable of being registered in plaintext according to a command CMD_LOAD_PLAIN_KEY. Also, the RAM_KEY key can also be registered using values M1, M2, and M3 in response to a command CMD_LOAD_KEY. However, when the RAM_KEY key is registered in response to the command CMD_LOAD_KEY, a counter value Counter is not included in the value M2 to be described below. Therefore, there is vulnerability to a replay attack. For updating the RAM_KEY key, the KEY_N key can be used. The number of times that the RAM_KEY key is rewritten is not limited.

(Method of Updating Key of SHE)

(1) Command CMD_LOAD_KEY

The MEK key, the BMK key, the BM key, the KEY_N key, and the RAM_KEY key can be updated in response to the command CMD_LOAD_KEY. In the command CMD_LOAD_KEY, the values M1, M2, and M3 expressed by the following Equation (1) are generated and the keys are updated.

[Math. 1]

$$M1 = UID\|ID\|Auth\_ID$$

$$M2 = ENC_{CBC,\, K1,\, IV=0}(Counter\|KEY\_FLAG\|\text{"0}\ldots\text{0"}_{94}\|KEY_{ID})$$

$$M3 = CMAC_{K2}(M1\|M2) \quad (1)$$

Here, "A||B" indicates a connection between A and B.

(2) Command CMD_LOAD_PLAIN_KEY

The RAM_KEY key can be registered in plaintext in response to the command CMD_LOAD_PLAIN_KEY. A key capable of being registered in plaintext in response to the command CMD_LOAD_PLAIN_KEY is only the RAM_KEY key.

The above is the description of the SHE.

[Assignment of Key for SHE]

In the present embodiment, an initial key, a key exchange key, and a MAC key are assigned to the SHE as described below.

(1) Initial Key: KEY_1 Key

An initial key is used in a process in which the first ECU 10 authenticates the validity of the second ECU 20. In the second ECU 20, its own initial key was preset to the KEY_1 key of the SHE 23, for example, when the second ECU 20 was manufactured or the like. The KEY_1 key is a key usable in the generation process and the verification process for the MAC.

(2) Key Exchange Key: KEY_2 Key (used in Mode 0 (Encryption Process and Decryption Process)) and KEY_3 Key (used in Mode 1 (Generation Process and Verification Process for MAC))

The key exchange key is used in a process in which the first ECU 10 distributes the MAC key to the second ECU 20. The key exchange key is generated by the first ECU 10 and distributed to the second ECU 20. A common value is used for the key exchange keys in the car 1.

(3) MAC Key: RAM_KEY Key

The MAC key is used in the generation process and the verification process for the MAC. The MAC key is generated by the first ECU 10 and encrypted with the key exchange key and thus distributed to the second ECU 20 whose validity has been verified.

[Initial Value of Key in SHE]

In the SHE, an initial value of each key unique to the SHE is 0. There is a possibility that the keys will be illegally set for the SHE as it is. Thus, in the present embodiment, for the SHE 23 of the second ECU 20, a value $K_{MASTER\_ECU\_KEY}$ among values indicated by the following Equations (2) is initially set to the MEK key, a value $K_{BOOT\_MAC\_KEY}$ is initially set to the BMK key, and a value $K_{KEY<N>}$ is initialized to the KEY_N key. Thereby, the keys are prevented from being illegally set for the SHE 23 of the second ECU 20. Also, as in the second ECU 20, initial setting of the keys may be performed for the SHE 13 of the first ECU 10.

[Math. 2]

$$K_{MASTER\_ECU\_KEY} = \text{digest}(MS,\, ID_a\|C_{MASTER\_ECU\_KEY})$$

$$K_{BOOT\_MAC\_KEY} = \text{digest}(MS,\, ID_a\|C_{BOOT\_MAC\_KEY})$$

$$K_{KEY\_N} = \text{digest}(MS,\, ID_a\|C_{KEY\_N}) \quad (2)$$

Here, MS is a master key (MASTER_SECRET: MS). The master key MS is used for generating the initial key. $ID_a$ is an identifier of the second ECU 20. $C_{MASTER\_ECU\_KEY}$ is a character string representing the MEK key. $C_{BOOT\_MAC\_KEY}$ is a character string representing the BMK key. $C_{KEY\_N}$ is a character string representing the KEY_N key. By including the character strings $C_{MASTER\_ECU\_KEY}$, $C_{BOOT\_MAC\_KEY}$, and $C_{KEY\_N}$, the type of key can be identified. In the above Equations (2), the CMAC is specifically used as a digest.

Next, an ECU authentication process, a key exchange key distribution process, and a MAC key distribution process according to the present embodiment will be described with reference to FIGS. 2 to 5.

[ECU Authentication Process]

Figure 2:
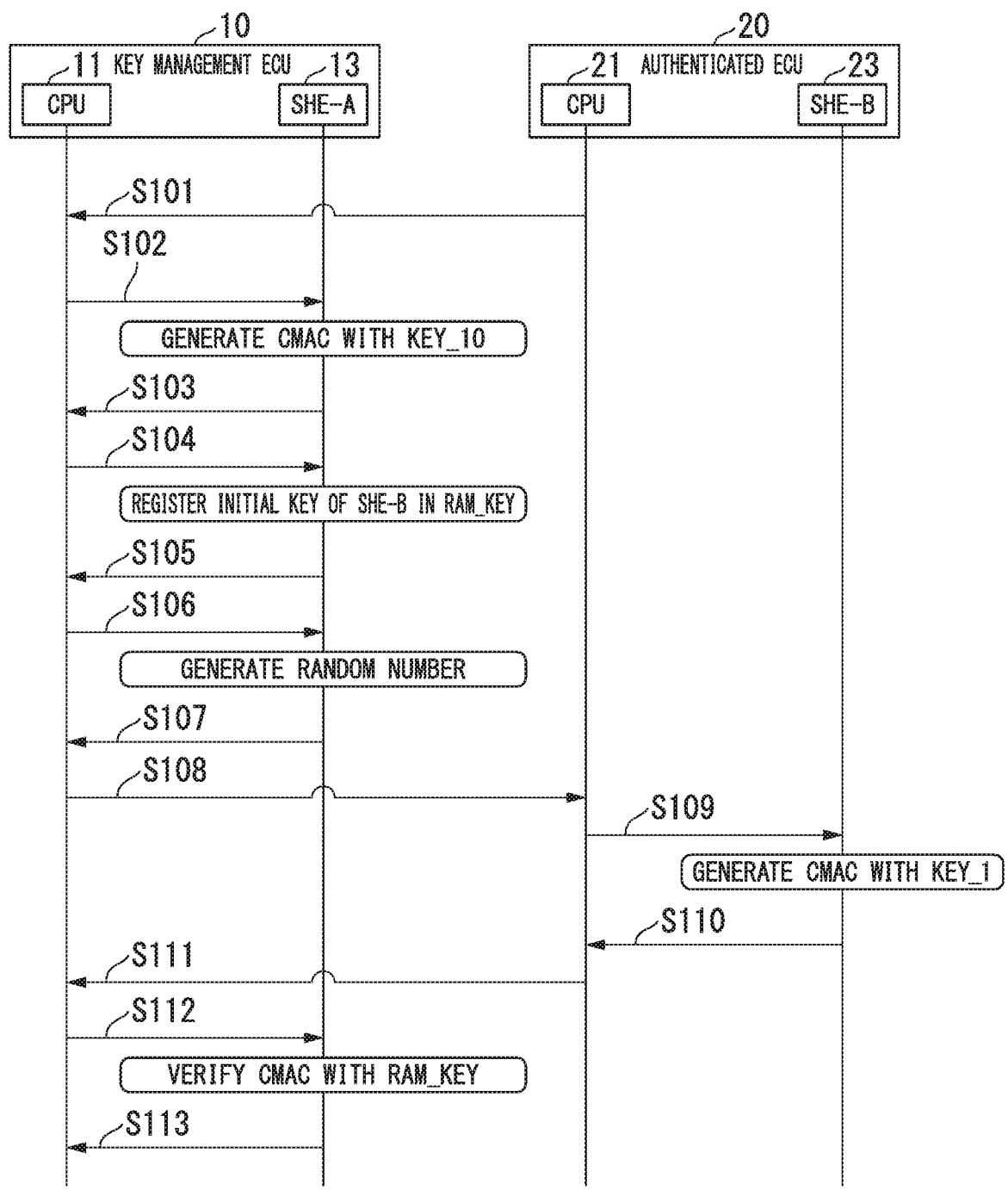
FIG. 2 is a sequence chart showing an ECU authentication method according to the first embodiment.

The ECU authentication process according to the present embodiment will be described with reference to FIG. 2. FIG.

2 is a sequence chart showing an ECU authentication method according to the present embodiment. The master key MS is preset in the KEY_10 key of the SHE-A 13 of the key management ECU 10, for example, when the key management ECU 10 is manufactured. The initial key of the authenticated ECU 20 is calculated by the following Equation (3).

[Math. 3]

$$K_{KEY\_1} = \text{digest}(MS, ID_a \| C_{KEY\_1}) \quad (3)$$

Specifically, the CMAC is used as a digest. Thereby, the initial key of the authenticated ECU 20 is calculated by the following Equation (4).

[Math. 4]

$$\text{Initial key} = CMAC(ECU\_ID \| C_{KEY\_1}) \quad (4)$$

Here, ECU_ID is an identifier of the authenticated ECU 20. The master key MS is used to calculate the CMAC of the above Equation (4).

In the present embodiment, the key management ECU 10 executes a process of sharing the initial key of the authenticated ECU 20 and verifies the validity of the authenticated ECU 20 according to a challenge-and-response scheme on the basis of the shared initial key.

(Step S101) In the authenticated ECU 20, the CPU 21 transmits the identifier ECU_ID of its own authenticated ECU 20 to the key management ECU 10.

(Step S102) In the key management ECU 10, the CPU 11 inputs a command CMD_GENERATE_MAC (ECU_ID-$\|C_{KEY\_1}$) to the SHE-A 13 by using the identifier ECU_ID of the authenticated ECU 20 and the character string $C_{KEY\_1}$ received from the authenticated ECU 20.

(Step S103) In the key management ECU 10, the SHE-A 13 generates the CMAC in response to the command CMD_GENERATE_MAC (ECU_ID$\|C_{KEY\_1}$) input from the CPU 11. In the generation of the CMAC, the SHE-A 13 calculates the CMAC according to the above Equation (4) by using the master key MS set to the KEY_10 key. The calculated CMAC is the initial key of the authenticated ECU 20 and has the same value as a value set in the KEY_1 key of the SHE-B 23 of the authenticated ECU 20. The SHE-A 13 outputs the generated CMAC to the CPU 11.

(Step S104) In the key management ECU 10, the CPU 11 inputs the command CMD_LOAD_PLAIN_KEY (CMAC) to the SHE-A 13 by using the CMAC received from the SHE-A 13.

(Step S105) In the key management ECU 10, the SHE-A 13 registers the CMAC included in the command CMD_LOAD_PLAIN_KEY (CMAC) in the RAM_KEY key in response to the command CMD_LOAD_PLAIN_KEY (CMAC) input from the CPU 11. Thereby, the initial key of the authenticated ECU 20 is registered in the RAM_KEY key of the SHE-A 13. The SHE-A 13 responds to the CPU 11 with registration completion "OK" of the RAM_KEY key.

(Step S106) In the key management ECU 10, the CPU 11 inputs a command CMD_RND to the SHE-A 13.

(Step S107) In the key management ECU 10, the SHE-A 13 generates a random number rand in response to the command CMD_RND input from the CPU 11. The SHE-A 13 outputs the generated random number rand to the CPU 11.

(Step S108) In the key management ECU 10, the CPU 11 transmits the random number rand received from the SHE-A 13 to the authenticated ECU 20.

(Step S109) In the authenticated ECU 20, the CPU 21 inputs the command CMD_GENERATE_MAC (rand) to the SHE-B 23 by using the random number rand received from the key management ECU 10.

(Step S110) In the authenticated ECU 20, the SHE-B 23 generates the CMAC in response to the command CMD_GENERATE_MAC (rand) input from the CPU 21. In the generation of the CMAC, the SHE-B 23 calculates the CMAC for the random number rand included in the command CMD_GENERATE_MAC (rand) by using the initial key set to the KEY_1 key. The SHE-B 23 outputs the generated CMAC to the CPU 21.

(Step S111) In the authenticated ECU 20, the CPU 21 transmits the identifier ECU_ID of its own authenticated ECU 20 and the CMAC received from the SHE-B 23 to the key management ECU 10.

(Step S112) In the key management ECU 10, the CPU 11 inputs a command CMD_VERIFY_MAC (rand, CMAC) to the SHE-A 13 by using the random number rand transmitted to the authenticated ECU 20 and the CMAC received from the authenticated ECU 20.

(Step S113) In the key management ECU 10, the SHE-A 13 verifies the CMAC included in the command CMD_VERIFY_MAC (rand, CMAC) in response to the command CMD_VERIFY_MAC (rand, CMAC) input from the CPU 11. In the verification of the CMAC, the SHE-A 13 uses the value registered in the RAM_KEY key, i.e., the initial key of the authenticated ECU 20. The SHE-A 13 outputs a CMAC verification result "success (OK) or failure (NG)" to the CPU 11. If the CMAC verification result received from the SHE-A 13 indicates success (OK), the CPU 11 determines that the authentication of the validity of the authenticated ECU 20 has succeeded. On the other hand, if the CMAC verification result received from the SHE-A 13 indicates failure (NG), the CPU 11 determines that the authentication of the validity of the authenticated ECU 20 has failed.

[Key Exchange Key Distribution Process]

Figure 3:
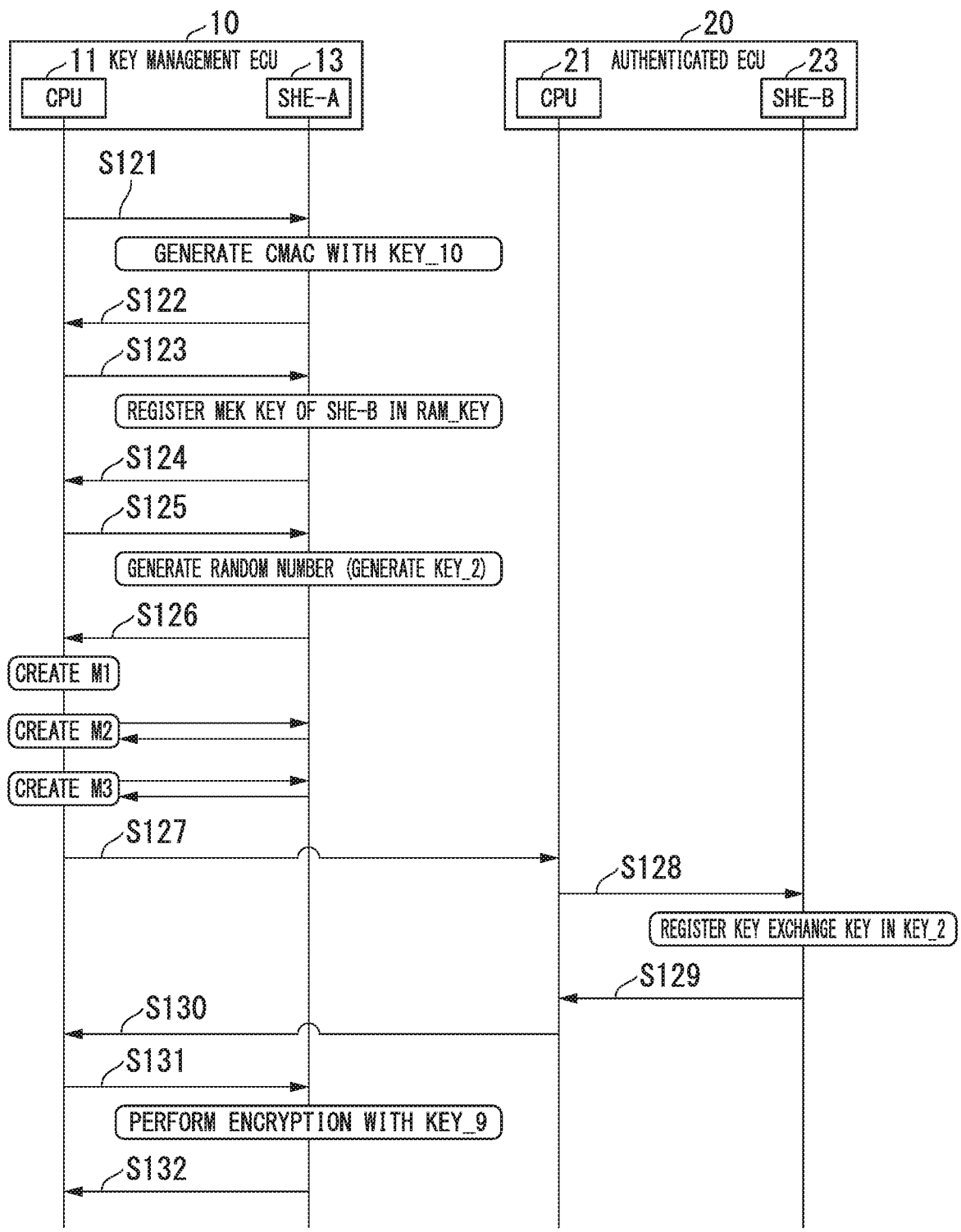
FIG. 3 is a sequence chart showing a key exchange key distribution method according to the first embodiment.

The key exchange key distribution process according to the present embodiment will be described with reference to FIG. 3. FIG. 3 is a sequence chart showing a key exchange key distribution method according to the present embodiment. In the present embodiment, two key exchange keys are used. One first key exchange key is used for the encryption process and the decryption process. The other second key exchange key is used for the generation process and the verification process for the MAC. It is preferable that the first key exchange key and the second key exchange key have different values. The key management ECU 10 distributes the first key exchange key and the second key exchange key to the authenticated ECU 20. In the authenticated ECU 20, the first key exchange key is set to the KEY_2 key of the SHE-B 23 and the second key exchange key is set to the KEY_3 key of the SHE-B 23.

Hereinafter, a case in which the first key exchange key is distributed will be described as an example with reference to FIG. 3. Also, a case in which the second key exchange key is distributed is similar to the case in which the first key exchange key is distributed.

(Step S121) In the key management ECU 10, the CPU 11 inputs the command CMD_GENERATE_MAC (ECU_ID-$\|C_{MASTER\_ECU\_KEY}$) to the SHE-A 13 by using the identifier ECU_ID of the authenticated ECU 20 of a distribution destination of the key exchange key and the character string $C_{MASTER\_ECU\_KEY}$.

(Step S122) In the key management ECU 10, the SHE-A 13 generates the CMAC in response to the command CMD_GENERATE_MAC (ECU_ID$\|C_{MASTER\_ECU\_KEY}$)

input from the CPU 11. In the generation of the CMAC, the SHE-A 13 calculates the CMAC as in the above Equation (4) by using the master key MS set to the KEY_10 key. The calculated CMAC has the same value as a value set in the MEK key of the SHE-B 23 of the authenticated ECU 20. The SHE-A 13 outputs the generated CMAC to the CPU 11.

(Step S123) In the key management ECU 10, the CPU 11 uses the CMAC received from the SHE-A 13 to input the command CMD_LOAD_PLAIN_KEY (CMAC) to the SHE-A 13.

(Step S124) In the key management ECU 10, the SHE-A 13 registers the CMAC included in the command CMD_LOAD_PLAIN_KEY (CMAC) in the RAM_KEY key in response to the command CMD_LOAD_PLAIN_KEY (CMAC) input from the CPU 11. Thereby, the MEK key of the SHE-B 23 of the authenticated ECU 20 is registered in the RAM_KEY key of the SHE-A 13. The SHE-A 13 responds to the CPU 11 with registration completion "OK" of the RAM_KEY key.

(Step S125) In the key management ECU 10, the CPU 11 inputs the command CMD_RND to the SHE-A 13.

(Step S126) In the key management ECU 10, the SHE-A 13 generates a random number rand in response to the command CMD_RND input from the CPU 11. The SHE-A 13 outputs the generated random number rand to the CPU 11. The random number rand is used in the first key exchange key, i.e., the KEY_2 key of the SHE-B 23 of the authenticated ECU 20.

(Step S127) In the key management ECU 10, the CPU 11 generates values M1, M2, and M3. The values M1, M2, and M3 are values for registering the random number rand received from the SHE-A 13 by the CPU 11, i.e., the first key exchange key, in the KEY_2 key of the SHE-B 23 of the authenticated ECU 20. When the value M2 is generated, the CPU 11 causes the SHE-A 13 to execute the encryption process according to a command "CMD_ENC_CBC with RAM_KEY." The value M2 includes the random number rand, i.e., the first key exchange key received from the SHE-A 13 by the CPU 11. When the value M3 is generated, the CPU 11 causes the SHE-A 13 to generate the CMAC according to the command "CMD_GENERATE_MAC with RAM_KEY." The CPU 11 transmits the generated values M1, M2, and M3 to the authenticated ECU 20.

(Step S128) In the authenticated ECU 20, the CPU 21 inputs the command CMD_LOAD_KEY (M1, M2, M3) to the SHE-B 23 by using the values M1, M2, and M3 received from the key management ECU 10.

(Step S129) In the authenticated ECU 20, the SHE-B 23 registers the random number rand included in the command CMD_LOAD_KEY (M1, M2, M3), i.e., the first key exchange key, in the KEY_2 key in response to the command CMD_LOAD_KEY (M1, M2, M3) input from the CPU 21. The SHE-B 23 responds to the CPU 11 with registration completion "OK" of the KEY_2 key.

(Step S130) In the authenticated ECU 20, the CPU 21 transmits the registration completion "OK" of the first key exchange key to the key management ECU 10.

(Step S131) In the key management ECU 10, the CPU 11 inputs the command CMD_ENC_CBC (rand) to the SHE-A 13 by using the random number rand transmitted to the authenticated ECU 20, i.e., the first key exchange key.

(Step S132) In the key management ECU 10, the SHE-A 13 encrypts the random number rand included in the command CMD_ENC_CBC (rand), i.e., the first key exchange key, with the KEY_9 key in response to the command CMD_ENC_CBC (rand) input from the CPU 11. In the KEY_9 key, a value is preset as Mode 0 usable in the encryption process and the decryption process. The SHE-A 13 outputs the encrypted first key exchange key to the CPU 11. The CPU 11 stores the encrypted first key exchange key received from the SHE-A 13 in the storage unit 12.

Also, when the first key exchange key for an initial time is distributed, the MEK key required for key registration of the SHE-B 23 of the authenticated ECU 20 or the preset KEY_2 key is different for each authenticated ECU 20. Thus, the key management ECU 10 needs to individually create a key registration message (the values M1, M2, and M3) for each authenticated ECU 20. On the other hand, when the first key exchange key for a second time or later is updated, the first key exchange key of each authenticated ECU 20 (the value of the KEY_2 key of the SHE-B 23) is the same. Thus, in the update of the first key exchange key for the second time or later, it is possible to create a key registration message by using the first key exchange key and it is unnecessary to individually create a key registration message for each authenticated ECU 20. This can similarly be applied to a case in which the second key exchange key is distributed.

[MAC Key Distribution Process]

Figure 4:
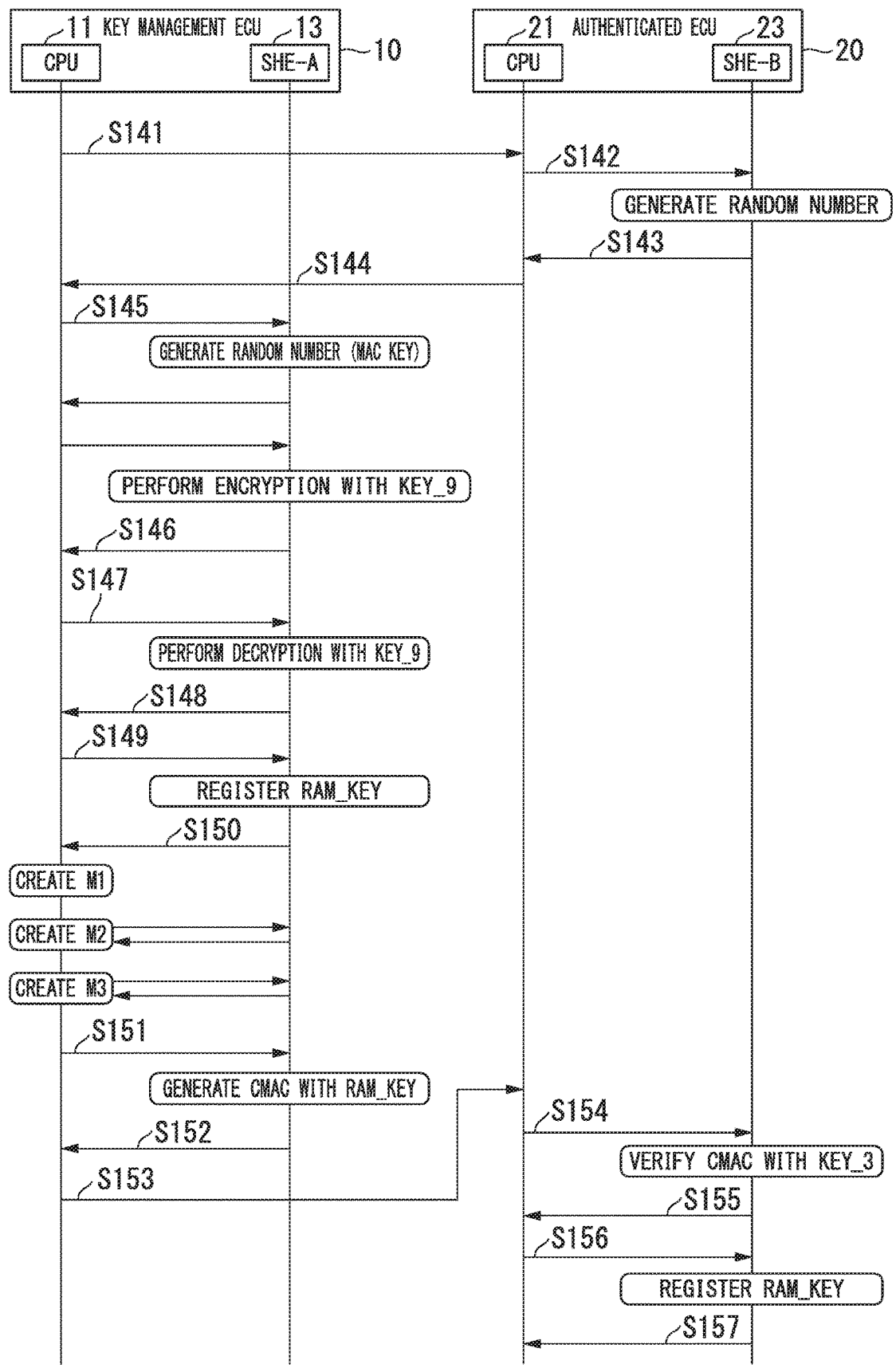
FIG. 4 is a sequence chart showing a MAC key distribution method according to the first embodiment.
Figure 5:
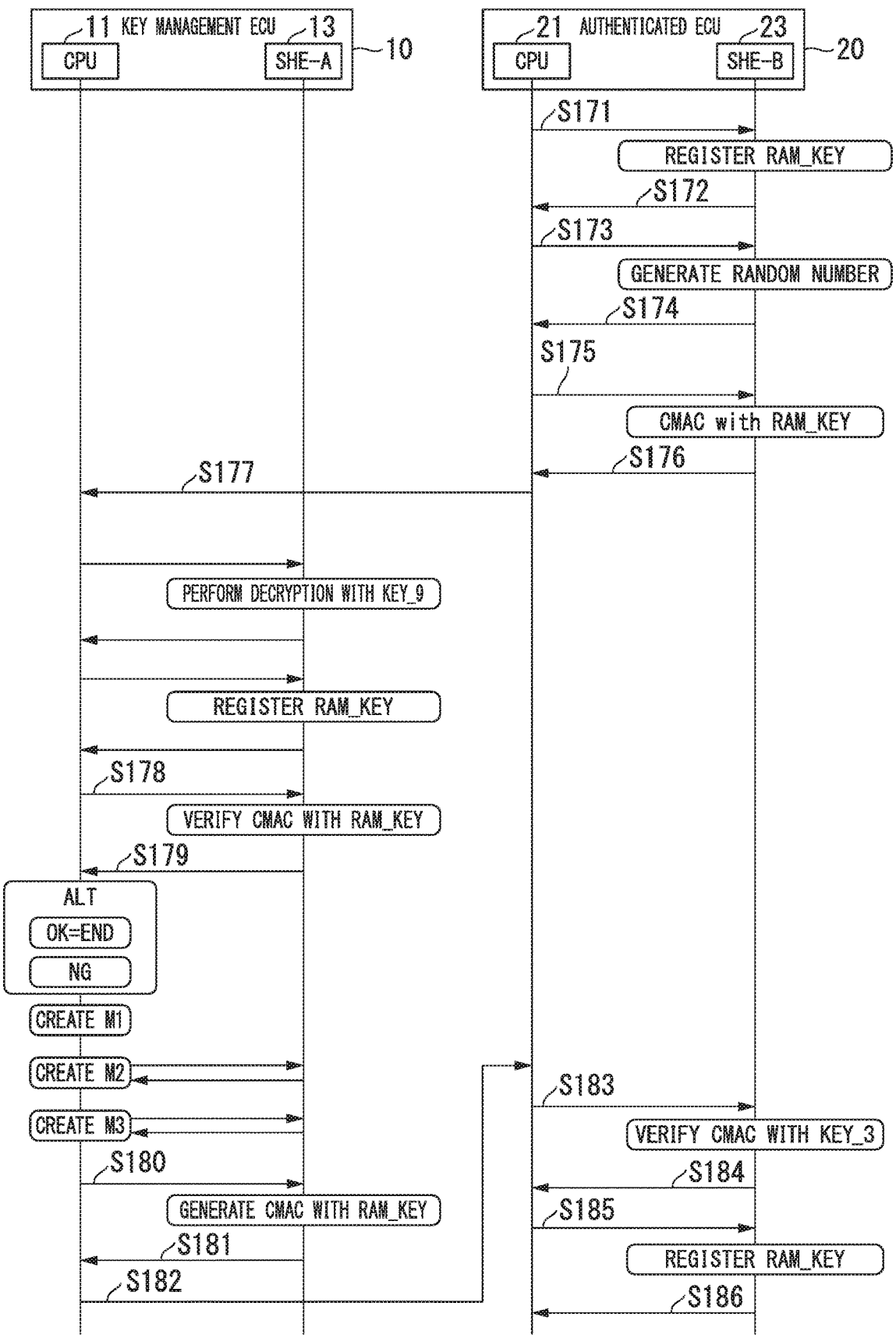
FIG. 5 is a sequence chart showing a MAC key distribution method according to the first embodiment.

A MAC key distribution process according to the present embodiment will be described with reference to FIGS. 4 and 5. FIGS. 4 and 5 are sequence charts showing a MAC key distribution method according to the present embodiment. In the in-vehicle control system of the car 1, the MAC key has two requirements: "high processing speed" and "resistance to frequent rewriting." The number of times that the KEY_N key of the SHE is rewritten is limited. Thus, in the present embodiment, the MAC key is registered in the RAM_KEY key of the SHE. By using the RAM_KEY key as the MAC key, encryption, decryption, and generation and verification for the MAC can be performed at high speed. A comparison of the processing speeds when the KEY_N key and the RAM_KEY key are used for the MAC key is shown as follows. Results of executing the same benchmark test in both the KEY_N key and the RAM_KEY key are as follows.

MAC generation processing time when the KEY_N key is used for the MAC key: 42.8 microseconds MAC generation processing time when the RAM_KEY key is used for the MAC key: 19.1 microseconds If the RAM_KEY key is registered according to the command CMD_LOAD_KEY, there is vulnerability to a replay attack because the counter value Counter is not included in the value M2 in the key registration message. Thus, in the present embodiment, the SHE-B 23 of the authenticated ECU 20 is configured to authenticate the validity of the key management ECU 10. Specifically, the SHE-B 23 generates a random number and transmits the random number to the key management ECU 10, the key management ECU 10 generates the CMAC of the random number, and sends the generated CMAC to the SHE-B 23, and the SHE-B 23 verifies the CMAC.

In the SHE-B 23 of the authenticated ECU 20, the first key exchange key (used for the encryption process and the decryption process) is registered in the KEY_2 key, and the second key exchange key (used for the generation process and the verification process for the MAC) is registered in the KEY_3 key. The storage unit 12 of the key management ECU 10 stores data obtained by encrypting the first key exchange key with the KEY_9 key of the SHE-A 13 of the key management ECU 10 (an encrypted first key exchange key) and data obtained by encrypting the second key exchange key with the KEY_9 key of the SHE-A 13 of the key management ECU 10 (an encrypted second key exchange key) in a non-volatile memory.

Also, the first key exchange key has the same value as the KEY_2 key of the SHE-B 23 of the authenticated ECU 20 and is referred to as a first key exchange key KEY_2. The second key exchange key is the same value as the KEY_3 key of the SHE-B 23 of the authenticated ECU 20 and is referred to as a second key exchange key KEY_3.

A first phase of the MAC key distribution process according to the present embodiment will be described with reference to FIG. 4. The first phase of the MAC key distribution process shown in FIG. 4 is started, for example, when the engine of the car 1 is started after a predetermined period or more has elapsed since the engine was stopped. For example, when the engine is initially started on a certain day, the first phase of the MAC key distribution process is started.

(Step S141) In the key management ECU 10, the CPU 11 requests a random number from the authenticated ECU 20.

(Step S142) In the authenticated ECU 20, the CPU 21 inputs a command CMD_RND to the SHE-B 23 in response to the request from the key management ECU 10.

(Step S143) In the authenticated ECU 20, the SHE-B 23 generates a random number 1 in response to the command CMD_RND input from the CPU 21. The SHE-B 23 outputs the generated random number 1 to the CPU 21.

(Step S144) In the authenticated ECU 20, the CPU 21 transmits the random number 1 received from the SHE-B 23 and the identifier ECU_ID of its own authenticated ECU 20 to the key management ECU 10.

Also, the random number 1 generated in the SHE-B 23 and the identifier ECU_ID of its own authenticated ECU 20 may voluntarily be sent from the authenticated ECU 20 to the key management ECU 10.

(Step S145) In the key management ECU 10, the CPU 11 inputs the command CMD_RND to the SHE-A 13.

(Step S146) In the key management ECU 10, the SHE-A 13 generates a random number 2 in response to the command CMD_RND input from the CPU 11. The SHE-A 13 outputs the generated random number 2 to the CPU 11. The random number 2 is used for the MAC key. The CPU 11 inputs the command CMD_ENC_CBC (the random number 2) to the SHE-A 13 by using the random number 2 received from the SHE-A 13, i.e., the MAC key. In response to the command CMD_ENC_CBC (the random number 2) input from the CPU 11, the SHE-A 13 encrypts the random number 2 included in the command CMD_ENC_CBC (the random number 2), i.e., the MAC key, with the KEY_9 key. The SHE-A 13 outputs the encrypted MAC key to the CPU 11. The CPU 11 stores the encrypted MAC key received from the SHE-A 13 in the storage unit 12.

(Step S147) In the key management ECU 10, the CPU 11 inputs a command CMD_DEC_CBC (the encrypted second key exchange key) to the SHE-A 13 by using the encrypted second key exchange key so as to decrypt the encrypted second key exchange key stored in the storage unit 12.

(Step S148) In the key management ECU 10, the SHE-A 13 decrypts the encrypted second key exchange key included in the command CMD_DEC_CBC (the encrypted second key exchange key) with the KEY_9 key in response to the command CMD_DEC_CBC (the encrypted second key exchange key) input from the CPU 11. The KEY_9 key is a key used to encrypt the encrypted first key exchange key and the encrypted second key exchange key. The SHE-A 13 outputs the second key exchange key KEY_3, which is a result of decrypting the encrypted second key exchange key, to the CPU 11.

(Step S149) In the key management ECU 10, the CPU 11 inputs the command CMD_LOAD_PLAIN_KEY (KEY_3) to the SHE-A 13 by using the second key exchange key KEY_3 received from the SHE-A 13.

(Step S150) In the key management ECU 10, the SHE-A 13 registers the second key exchange key KEY_3 included in the command CMD_LOAD_PLAIN_KEY (KEY_3) in the RAM_KEY key in response to the command CMD_LOAD_PLAIN_KEY (KEY_3) input from the CPU 11. The SHE-A 13 responds to the CPU 11 with registration completion "OK" of the RAM_KEY key.

(Step S151) In the key management ECU 10, the CPU 11 generates the values M1, M2, and M3. The values M1, M2, and M3 are values for registering the random number 2 received from the SHE-A 13 by the CPU 11, i.e., the MAC key, in the RAM_KEY key of the SHE-B 23 of the authenticated ECU 20. When the value M2 is generated, the CPU 11 causes the SHE-A 13 to execute an encryption process according to the command "CMD_ENC_CBC with RAM_KEY." The value M2 includes the random number 2 received from the SHE-A 13 by the CPU 11, i.e., the MAC key. When the value M3 is generated, the CPU 11 causes the SHE-A 13 to generate a CMAC according to the command "CMD_GENERATE_MAC with RAM_KEY." Also, the CPU 11 inputs the command CMD_GENERATE_MAC (the random number 1) to the SHE-A 13 by using the random number 1 received from the authenticated ECU 20.

(Step S152) In the key management ECU 10, the SHE-A 13 generates the CMAC in response to the command CMD_GENERATE_MAC (the random number 1) input from the CPU 11. In the generation of the CMAC, the SHE-A 13 generates the CMAC of the random number 1 by using the RAM_KEY key, i.e., the second key exchange key KEY_3. The SHE-A 13 outputs the generated CMAC of the random number 1 to the CPU 11.

(Step S153) In the key management ECU 10, the CPU 11 transmits the generated values M1, M2, and M3 and the CMAC of the random number 1 received from the SHE-A 13 to the authenticated ECU 20.

(Step S154) In the authenticated ECU 20, the CPU 21 inputs the command CMD_VERIFY_MAC to the SHE-A 13 in order to verify the CMAC received from the key management ECU 10.

(Step S155) In the authenticated ECU 20, the SHE-B 23 verifies the CMAC included in the command CMD_VERIFY_MAC in response to the command CMD_VERIFY_MAC input from the CPU 21. In the verification of the CMAC, the SHE-B 23 uses the random number 1 generated by itself and the KEY_3 key, i.e., the second key exchange key KEY_3. The SHE-B 23 outputs the CMAC verification result "success (OK) or failure (NG)" to the CPU 21. If the CMAC verification result received from the SHE-B 23 is success (OK), the CPU 21 determines that the authentication of the validity of the key management ECU 10 has succeeded. On the other hand, if the CMAC verification result received from the SHE-B 23 is failure (NG), the CPU 21 determines that the authentication of the validity of the key management ECU 10 has failed. If the authentication of the validity of the key management ECU 10 has succeeded, the process proceeds to step S156. On the other hand, if the authentication of the validity of the key management ECU 10 has failed, the process of FIG. 4 is terminated.

(Step S156) In the authenticated ECU 20, the CPU 21 inputs the command CMD_LOAD_KEY (M1, M2, M3) to the SHE-B 23 by using the values M1, M2, and M3 received from the key management ECU 10.

(Step S157) In the authenticated ECU 20, the SHE-B 23 registers the random number 2 included in the command CMD_LOAD_KEY (M1, M2, M3), i.e., the MAC key, in the RAM_KEY key, in response to the command CMD_LOAD_KEY (M1, M2, and M3) input from the CPU 21. The SHE-B 23 responds to the CPU 21 with registration completion "OK" of the RAM_KEY key.

Next, a second phase of the MAC key distribution process according to the present embodiment will be described with reference to FIG. 5. The second phase of the MAC key distribution process is executed after the MAC key is registered in the RAM_KEY key of the SHE-B 23 of the authenticated ECU 20 according to the first phase of the MAC key distribution process shown in FIG. 4 described above. The authenticated ECU 20 stores the values M1, M2, and M3 received from the key management ECU 10 in step S153 of the first phase of the MAC key distribution process in the non-volatile memory of the storage unit 22. The second phase of the MAC key distribution process shown in FIG. 5 is started, for example, when the engine is restarted within a predetermined period after the engine has stopped due to parking or the like during traveling of the car 1.

(Step S171) In the authenticated ECU 20, the CPU 21 inputs the command CMD_LOAD_KEY (M1, M2, M3) to the SHE-B 23 by using the values M1, M2, and M3 stored in the non-volatile memory of the storage unit 22.

(Step S172) In the authenticated ECU 20, the SHE-B 23 registers the random number 2 included in the command CMD_LOAD_KEY (M1, M2, M3), i.e., the MAC key, in the RAM_KEY key in response to the command CMD_LOAD_KEY (M1, M2, M3) input from the CPU 21. The SHE-B 23 responds to the CPU 21 with registration completion "OK" of the RAM_KEY key.

(Step S173) In the authenticated ECU 20, the CPU 21 inputs the command CMD_RND to the SHE-B 23.

(Step S174) In the authenticated ECU 20, the SHE-B 23 generates the random number 1 in response to the command CMD_RND input from the CPU 21. The SHE-B 23 outputs the generated random number 1 to the CPU 21.

(Step S175) In the authenticated ECU 20, the CPU 21 inputs the command CMD_GENERATE_MAC (ECU_ID, the random number 1) to the SHE-B 23 by using the identifier ECU_ID of its own authenticated ECU 20 and the random number 1.

(Step S176) In the authenticated ECU 20, the SHE-B 23 generates the CMAC in response to the command CMD_GENERATE_MAC (ECU_ID, the random number 1) input from the CPU 21. In the generation of the CMAC, the SHE-B 23 uses the RAM_KEY key, i.e., the MAC key, to generate the CMAC for ECU_ID and the random number 1. For example, the CMAC is generated for the connected data of the ECU_ID and the random number 1. The SHE-B 23 outputs the generated CMAC to the CPU 21.

(Step S177) In the authenticated ECU 20, the CPU 21 transmits the random number 1 received from the SHE-B 23, the identifier ECU_ID of its own authenticated ECU 20, and the CMAC received from the SHE-B 23 to the key management ECU 10.

(Step S178) In the key management ECU 10, the CPU 11 inputs the command CMD_DEC_CBC (the encrypted MAC key) to the SHE-A 13 by using the encrypted MAC key so as to decrypt the encrypted MAC key stored in the storage unit 12. In response to the command CMD_DEC_CBC (the encrypted MAC key) input from the CPU 11, the SHE-A 13 decrypts the encrypted MAC key included in the command CMD_DEC_CBC (the encrypted MAC key) with the KEY_9 key. The KEY_9 key is a key used for encrypting the encrypted MAC key. The SHE-A 13 outputs the MAC key, which is a result of decrypting the encrypted MAC key, to the CPU 11. The CPU 11 inputs the command CMD_LOAD_PLAIN_KEY (the MAC key) to the SHE-A 13 by using the MAC key received from the SHE-A 13. In response to the command CMD_LOAD_PLAIN_KEY (the MAC key) input from the CPU 11, the SHE-A 13 registers the MAC key included in the command CMD_LOAD_PLAIN_KEY (the MAC key) in the RAM_KEY key. The SHE-A 13 responds to the CPU 11 with registration completion "OK" of the RAM_KEY key. The CPU 11 inputs the command CMD_VERIFY_MAC (CMAC) to the SHE-A 13 by using the random number 1 received from the authenticated ECU 20, the identifier ECU_ID of the authenticated ECU 20, and the CMAC.

(Step S179) In the key management ECU 10, the SHE-A 13 verifies the CMAC included in the command CMD_VERIFY_MAC (CMAC) in response to the command CMD_VERIFY_MAC (CMAC) input from the CPU 11. In the verification of the CMAC, the SHE-A 13 uses the random number 1 included in the command CMD_VERIFY_MAC (CMAC), the identifier ECU_ID of the authenticated ECU 20, and the MAC key registered in the RAM_KEY key.

The SHE-A 13 outputs the CMAC verification result "success (OK) or failure (NG)" to the CPU 11. If the CMAC verification result received from the SHE-A 13 is success (OK), the CPU 11 determines that the authentication of the validity of the authenticated ECU 20 has succeeded. On the other hand, if the CMAC verification result received from the SHE-A 13 is failure (NG), the CPU 11 determines that the authentication of the validity of the authenticated ECU 20 has failed. If the authentication of the validity of the authenticated ECU 20 has succeeded, the process proceeds to step S180. On the other hand, if the authentication of the validity of the authenticated ECU 20 has failed, the process of FIG. 5 is terminated. If the authentication of the validity of the authenticated ECU 20 has failed, the first phase of the MAC key distribution process shown in FIG. 4 may be performed.

Next, steps S180 to S186 are executed. Steps S180 to S186 are the same as steps S151 to S157 shown in FIG. 4. However, the values M1, M2, and M3 generated in step S180 are values for registering a new MAC key in the RAM_KEY key of the SHE-B 23 of the authenticated ECU 20. In the new MAC key, as in the steps S145 to S146 shown in FIG. 4, a new random number 2 generated by the SHE-A 13 may be used.

In the second phase of the MAC key distribution process shown in FIG. 5 described above, updating to the new MAC key is performed.

Also, in the above-described step S180 of FIG. 5, the CMAC of the random number 1 is generated. However, if the CMAC verification result is success (OK) in step S179, a CMAC for a character string indicating the success of the verification of the CMAC, for example, "OK," and the identifier ECU_ID of the authenticated ECU 20 may be generated. For example, the CMAC is generated for connection data between the character string "OK" and the identifier ECU_ID of the authenticated ECU 20.

Furthermore, in the above-described step S180 of FIG. 5, updating to the new MAC key is performed. However, if the CMAC verification result is success (OK) in step S179, updating to the new MAC key is not performed and the MAC key currently registered in the RAM_KEY key of the SHE-B 23 may be used. Thereby, because it is unnecessary to send the values M1, M2, and M3 from the key management ECU 10 to the authenticated ECU 20, the process can be speeded up.

Also, in the present embodiment, no key is used to calculate the value M1. Thus, the key management ECU 10 may transmit only the values M2 and M3 to the authenticated ECU 20 without transmitting the value M1 to the authenticated ECU 20. In this case, the authenticated ECU 20 uses the value M1 calculated by itself and the values M2 and M3 received from the key management ECU 10 in combination. Thereby, because it is unnecessary to send the value M1 from the key management ECU 10 to the authenticated ECU 20, the process can be speeded up.

Second Embodiment

Figure 6:
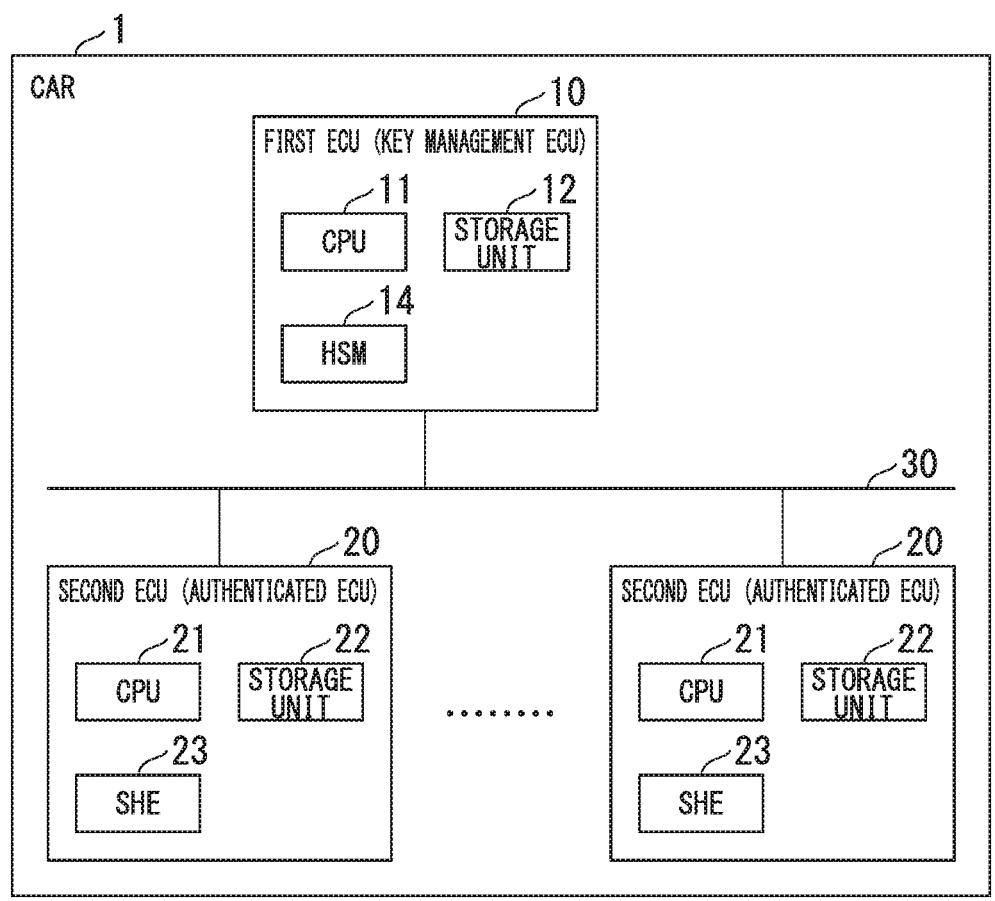
FIG. 6 is a diagram showing a configuration example of an in-vehicle computer system provided in a car according to a second embodiment.

FIG. 6 is a diagram showing a configuration example of an in-vehicle computer system provided in the car 1 according to the present embodiment. In FIG. 6, parts corresponding to those of FIG. 1 are denoted by the same reference numerals, and description thereof will be omitted. Hereinafter, parts different from the first embodiment will be mainly described. In the first ECU 10 according to the first embodiment, the SHE is used as the cipher processing chip. However, in a first ECU 10 according to the second embodiment, a hardware security module (HSM) called "Evita-medium" is used as the cipher processing chip.

In FIG. 6, the first ECU 10 includes a CPU 11, a storage unit 12, and an HSM 14. The HSM 14 is an HSM called "Evita-medium." The HSM 14 has a cipher processing function. The HSM 14 has tamper-resistant properties. The HSM 14 is an example of a secure element. A second ECU 20 includes a CPU 21, a storage unit 22, and an SHE 23.

Next, an ECU authentication process, a key exchange key distribution process, and a MAC key distribution process according to the present embodiment will be described with reference to FIGS. 7 to 10.

[ECU Authentication Process]

Figure 7:
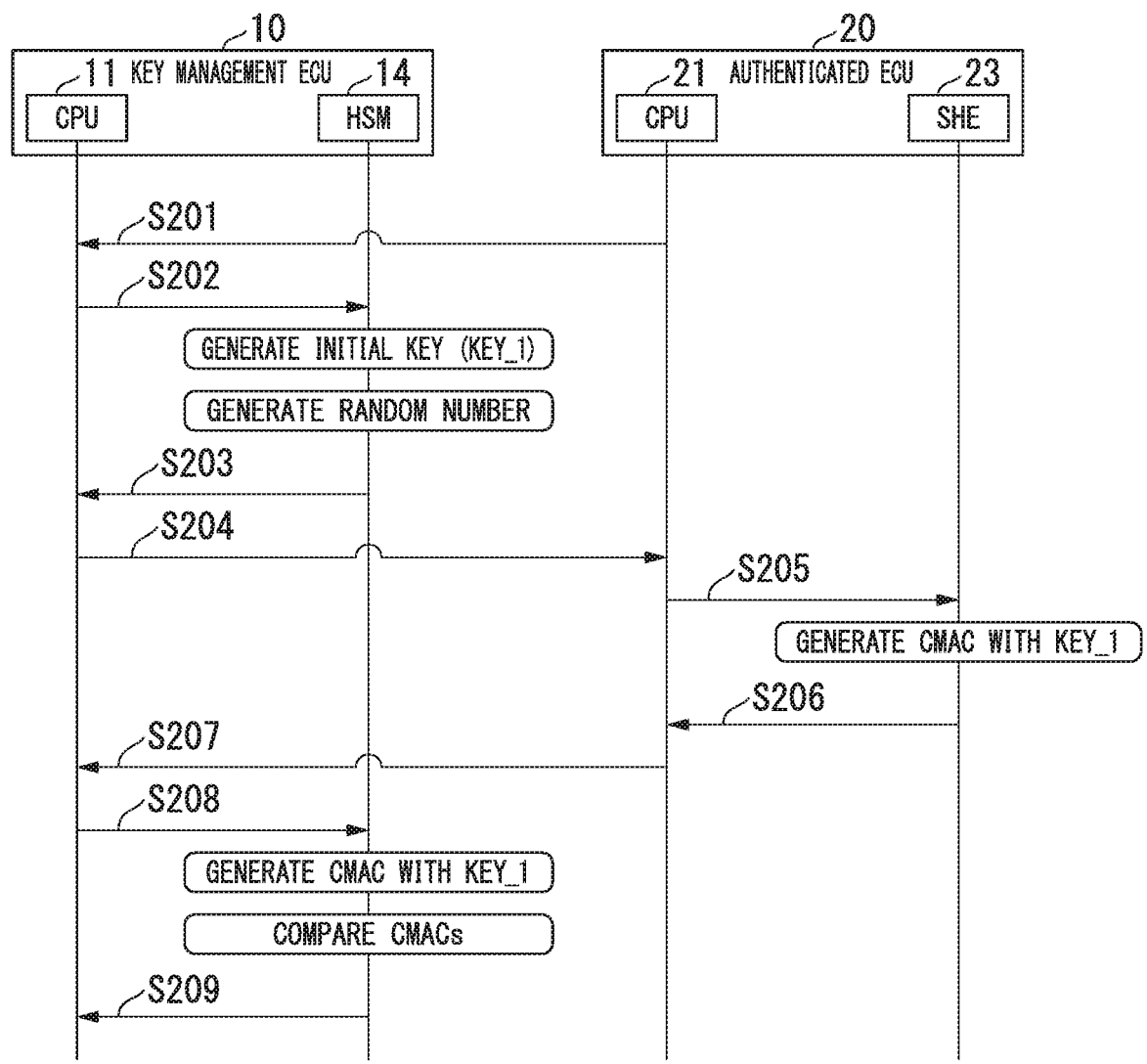
FIG. 7 is a sequence chart showing an ECU authentication method according to the second embodiment.

The ECU authentication process according to the present embodiment will be described with reference to FIG. 7. FIG. 7 is a sequence chart showing the ECU authentication method according to the present embodiment. In the HSM 14 of the key management ECU 10, a master key MS is preset, for example, when the key management ECU 10 is manufactured or the like.

(Step S201) In the authenticated ECU 20, the CPU 21 transmits the identifier ECU_ID of its own authenticated ECU 20 to the key management ECU 10.

(Step S202) In the key management ECU 10, the CPU 11 inputs the identifier ECU_ID of the authenticated ECU 20 received from the authenticated ECU 20 to the HSM 14.

(Step S203) In the key management ECU 10, the HSM 14 generates an initial key of the authenticated ECU 20 by using the identifier ECU_ID of the authenticated ECU 20 input from the CPU 11 and the master key MS stored by the HSM 14. In the generation of the initial key, a CMAC is calculated by the above Equation (4). The calculated CMAC is the initial key of the authenticated ECU 20 and has the same value as a value set in the KEY_1 key of the SHE-B 23 of the authenticated ECU 20. The initial key of the authenticated ECU 20 is referred to as an initial key KEY_1. The HSM 14 stores the calculated CMAC, i.e., the initial key KEY_1, in its own memory. Also, the HSM 14 generates a random number rand. The HSM 14 outputs the generated random number rand to the CPU 11. The HSM 14 stores the generated random number rand in its own memory.

(Step S204) In the key management ECU 10, the CPU 11 transmits the random number rand received from the HSM 14 to the authenticated ECU 20.

Next, steps S205 to S207 are executed. Steps S205 to S207 are the same as steps S109 to S111 shown in FIG. 2.

(Step S208) In the key management ECU 10, the CPU 11 inputs the identifier ECU_ID of the authenticated ECU 20 and the CMAC received from the authenticated ECU 20 to the HSM 14.

(Step S209) In the key management ECU 10, the HSM 14 verifies the CMAC input from the CPU 11. In the verification of the CMAC, the HSM 14 calculates the CMAC for the random number rand stored in its own memory by using the initial key KEY_1 stored in its own memory. Next, the HSM 14 compares the calculated CMAC with the CMAC input from the CPU 11. If a result of the comparison indicates that the two match, the verification of the CMAC succeeds. On the other hand, if they do not match, the verification of the CMAC fails. The HSM 14 outputs the CMAC verification result "success (OK) or failure (NG)" to the CPU 11. If the CMAC verification result received from the HSM 14 is success (OK), the CPU 11 determines that the authentication of the validity of the authenticated ECU 20 has succeeded. On the other hand, if the CMAC verification result received from the HSM 14 is failure (NG), the CPU 11 determines that the authentication of the validity of the authenticated ECU 20 has failed.

[Key Exchange Key Distribution Process]

Figure 8:
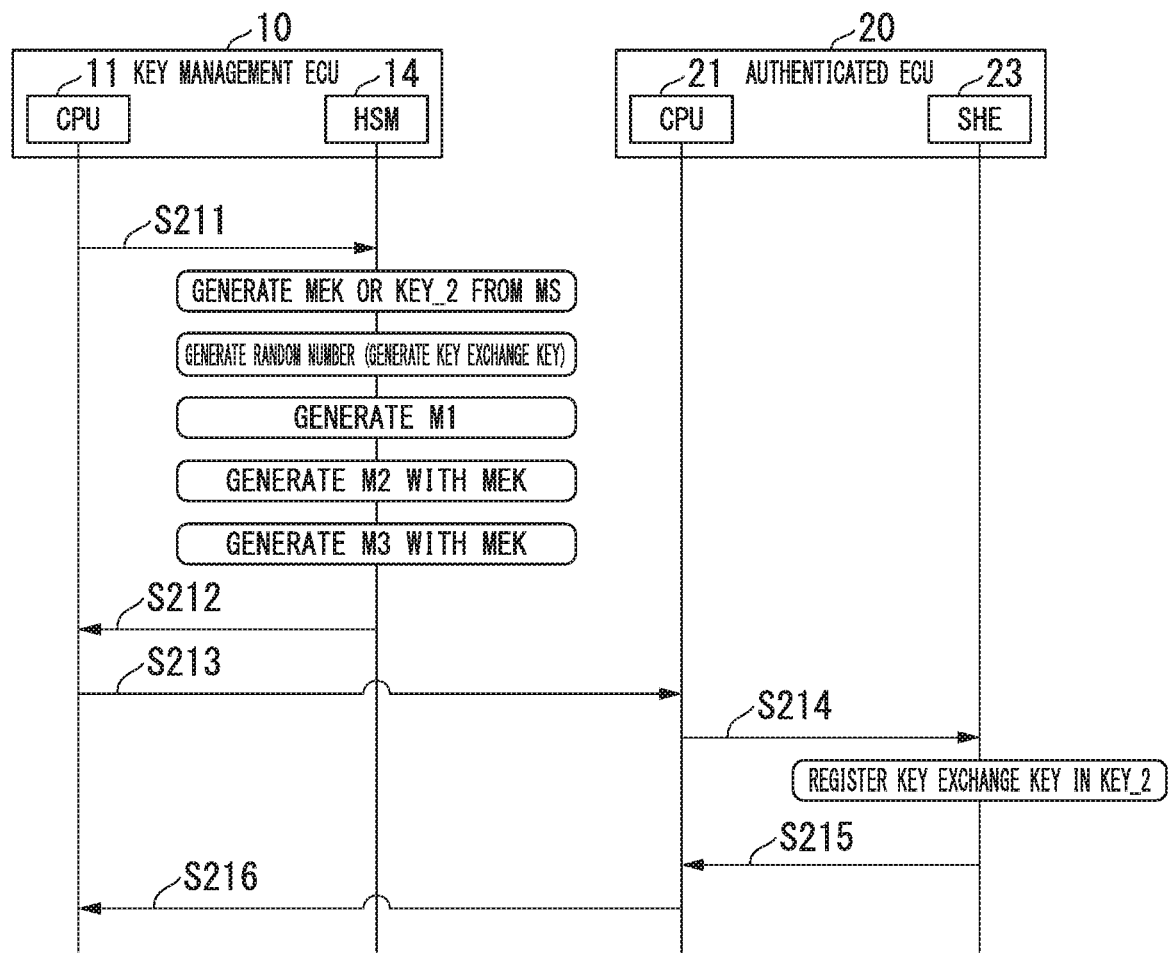
FIG. 8 is a sequence chart showing a key exchange key distribution method according to the second embodiment.

A key exchange key distribution process according to the present embodiment will be described with reference to FIG. 8. FIG. 8 is a sequence chart showing a key exchange key distribution method according to the present embodiment. In the present embodiment, as in the first embodiment, a first key exchange key (a key used for an encryption process and a decryption process) and a second key exchange key (a key used for a generation process and a verification process for a MAC) are used.

Hereinafter, a case in which the first key exchange key is distributed will be described as an example with reference to FIG. 8. Also, a case in which the second key exchange key is distributed is similar to the case in which the first key exchange key is distributed.

(Step S211) In the key management ECU 10, the CPU 11 inputs a key exchange key creation request (ECU_ID) to the HSM 14 by using the identifier ECU_ID of the authenticated ECU 20 serving as a distribution destination of the key exchange key.

(Step S212) In the key management ECU 10, the HSM 14 generates values M1, M2, and M3. The values M1, M2, and M3 are values for registering the first key exchange key in a KEY_2 key of the SHE-B 23 of the authenticated ECU 20. The HSM 14 generates an MEK key from the master key MS. The HSM 14 generates a random number and uses the generated random number as the first key exchange key. Also, the HSM 14 may generate the first key exchange key from the master key MS. The HSM 14 stores the first key exchange key in its own memory. The HSM 14 outputs the generated values M1, M2, and M3 to the CPU 11.

(Step S213) In the key management ECU 10, the CPU 11 transmits the values M1, M2, and M3 received from the HSM 14 to the authenticated ECU 20.

Next, steps S214 to S216 are executed. Steps S214 to S216 are the same as steps S128 to S130 shown in FIG. 3.

In second and subsequent key exchange key distributions, a key registration message (the values M1, M2, and M3) is generated using the registered first key exchange key, so that the key registration message (the value M1, M2, and M3) can be commonly used for each authenticated ECU 20. For example, it is possible to broadcast the key registration message (the values M1, M2, and M3). This can also be similarly applied to a case in which the second key exchange key is distributed.

[MAC Key Distribution Process]

Figure 9:
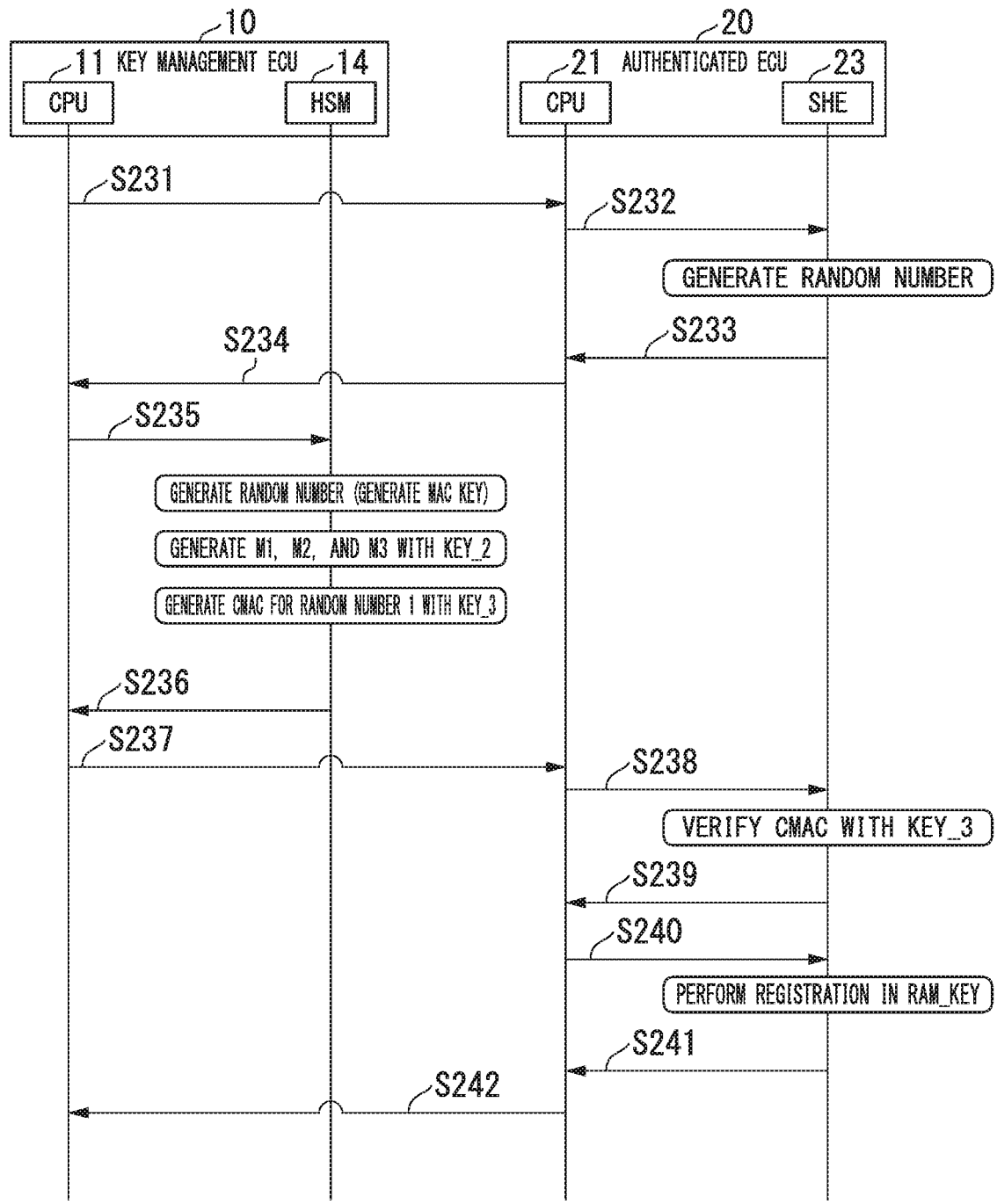
FIG. 9 is a sequence chart showing a MAC key distribution method according to the second embodiment.
Figure 10:
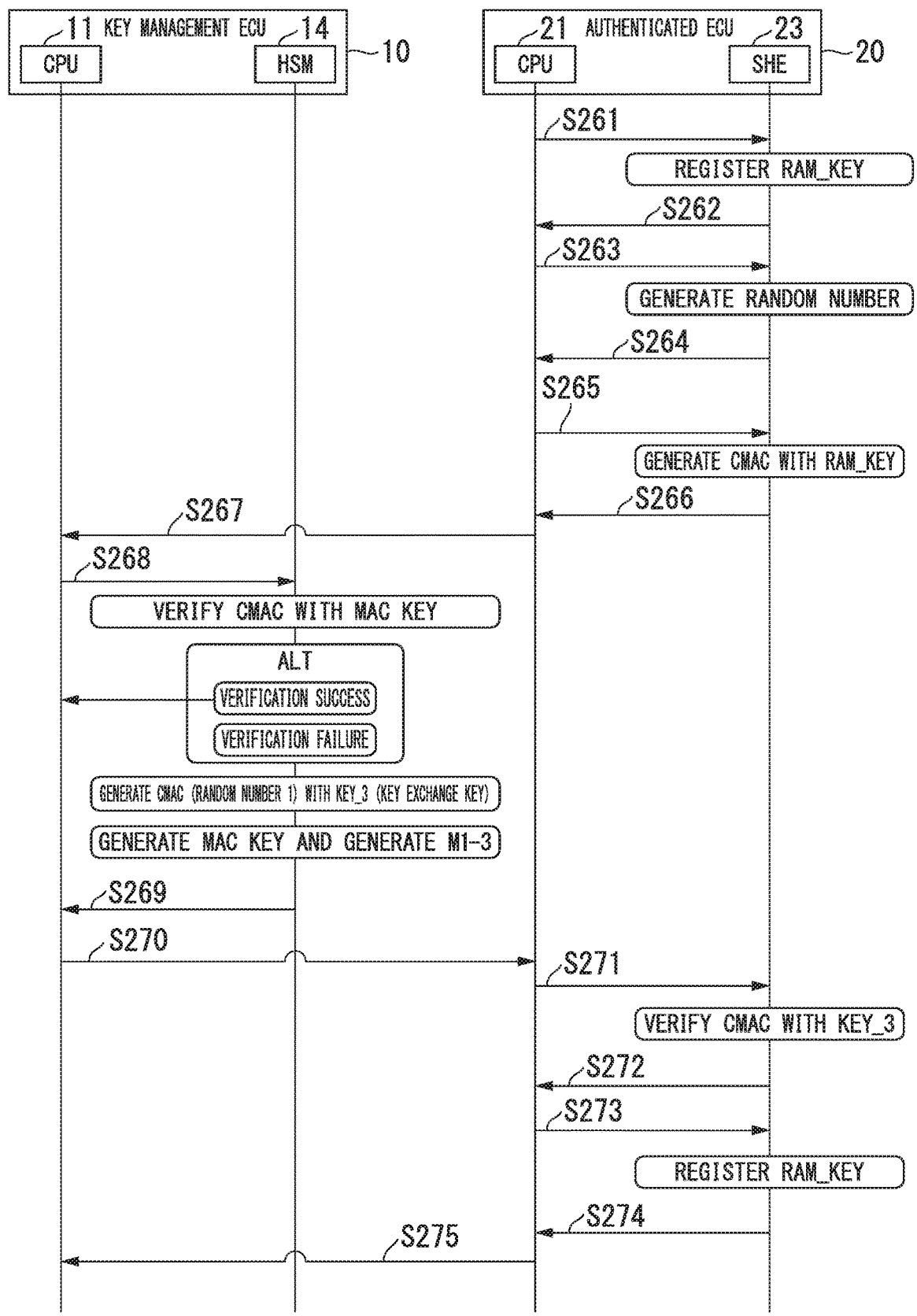
FIG. 10 is a sequence chart showing a MAC key distribution method according to the second embodiment.

The MAC key distribution process according to the present embodiment will be described with reference to FIGS. 9 and 10. FIGS. 9 and 10 are sequence charts showing the MAC key distribution method according to the present embodiment. In the SHE-B 23 of the authenticated ECU 20, a first key exchange key (used for the encryption process and the decryption process) is registered in the KEY_2 key, and a second key exchange key (used for the generation process and the verification process for the MAC) is registered in a KEY_3 key. The HSM 14 of the key management ECU 10 stores the first key exchange key and the second key exchange key in its own memory.

Also, the first key exchange key has the same value as the KEY_2 key of the SHE-B 23 of the authenticated ECU 20 and is referred to as a first key exchange key KEY_2. The second key exchange key is the same value as the KEY_3 key of the SHE-B 23 of the authenticated ECU 20 and is referred to as a second key exchange key KEY_3.

A first phase of the MAC key distribution process according to the present embodiment will be described with reference to FIG. 9. The first phase of the MAC key distribution process shown in FIG. 9 is started, for example, when the engine of the car 1 is started after a predetermined period or more has elapsed since the engine was stopped. For example, when the engine is initially started on a certain day, the first phase of the MAC key distribution process is started.

Steps S231 to S234 are executed. Steps S231 to S234 are the same as steps S141 to S144 shown in FIG. 4.

(Step S235) In the key management ECU 10, the CPU 11 inputs a random number 1 received from the authenticated ECU 20 to the HSM 14.

(Step S236) In the key management ECU 10, the HSM 14 generates a random number and uses the generated random number as a MAC key. The HSM 14 stores the MAC key in its own memory. The HSM 14 generates the values M1, M2, and M3. The values M1, M2, and M3 are values for registering the MAC key in a RAM_KEY key of the SHE-B 23 of the authenticated ECU 20. The HSM 14 uses the first key exchange key KEY_2 stored in its own memory to generate the values M1, M2, and M3. The HSM 14 generates a CMAC for the random number 1 input from the CPU 11. In the generation of the CMAC, the HSM 14 uses the second key exchange key KEY_3 stored in its own memory to generate the CMAC for the random number 1. The HSM 14 outputs the generated values M1, M2, and M3 and the CMAC to the CPU 11.

(Step S237) In the key management ECU 10, the CPU 11 transmits the values M1, M2, and M3 and the CMAC received from the HSM 14 to the authenticated ECU 20.

Next, steps S238 to S241 are executed. Steps S238 to S241 are the same as steps S154 to S157 shown in FIG. 4.

(Step S242) In the authenticated ECU 20, the CPU 21 transmits MAC key registration completion "OK" to the key management ECU 10.

Next, the second phase of the MAC key distribution process according to the present embodiment will be described with reference to FIG. 10. The second phase of the MAC key distribution process is executed after the MAC key is registered in the RAM_KEY key of the SHE-B 23 of the authenticated ECU 20 in the first phase of the MAC key distribution process shown in FIG. 9 described above. The authenticated ECU 20 stores the values M1, M2, and M3 received from the key management ECU 10 in step S237 of the first phase of the MAC key distribution process in the non-volatile memory of the storage unit 22. The second phase of the MAC key distribution process shown in FIG. 10 is started, for example, when the engine is restarted within a predetermined period after the engine has stopped due to parking or the like during traveling of the car 1.

Steps S261 to S267 are executed. Steps S261 to S267 are the same as steps S171 to S177 shown in FIG. 5.

(Step S268) In the key management ECU 10, the CPU 11 inputs the random number 1, the identifier ECU_ID of the authenticated ECU 20, and the CMAC received from the authenticated ECU 20 to the HSM 14.

(Step S269) In the key management ECU 10, the HSM 14 verifies the CMAC input from the CPU 11. In the verification of the CMAC, the HSM 14 uses the MAC key stored in its own memory.

The HSM 14 outputs the CMAC verification result "success (OK) or failure (NG)" to the CPU 11. If the CMAC verification result received from the HSM 14 is success (OK), the CPU 11 determines that the authentication of the validity of the authenticated ECU 20 has succeeded. On the other hand, if the CMAC verification result received from the HSM 14 is failure (NG), the CPU 11 determines that the authentication of the validity of the authenticated ECU 20 has failed. If the authentication of the validity of the authenticated ECU 20 succeeds, the subsequent processing is executed. On the other hand, if the authentication of the validity of the authenticated ECU 20 fails, the process of FIG. 10 is terminated. If the authentication of the validity of the authenticated ECU 20 fails, the first phase of the MAC key distribution process shown in FIG. 9 may be performed.

The HSM 14 generates the CMAC for the random number 1 input from the CPU 11. In the generation of the CMAC, the HSM 14 uses the second key exchange key KEY_3 stored in its own memory to generate the CMAC for the random number 1.

The HSM 14 generates a new MAC key and generates the values M1, M2, and M3. The values M1, M2, and M3 are values for registering a new MAC key in the RAM_KEY key of the SHE-B 23 of the authenticated ECU 20. A new random number is generated for the new MAC key and the generated random number is used as the new MAC key. If the MAC key of the authenticated ECU 20 is not updated to the new MAC key, the generation of the new MAC key and the generation of the values M1, M2, and M3 are not performed.

The HSM 14 outputs the generated CMAC and the values M1, M2, and M3 to the CPU 11.

(Step S270) In the key management ECU 10, the CPU 11 transmits the values M1, M2, and M3 and the CMAC received from the HSM 14 to the authenticated ECU 20.

Next, steps S271 to S275 are executed. Steps S271 to S275 are the same as steps S238 to S242 shown in FIG. 9.

According to the second phase of the MAC key distribution process shown in FIG. 10 described above, updating to the new MAC key is performed.

Third Embodiment

Figure 11:
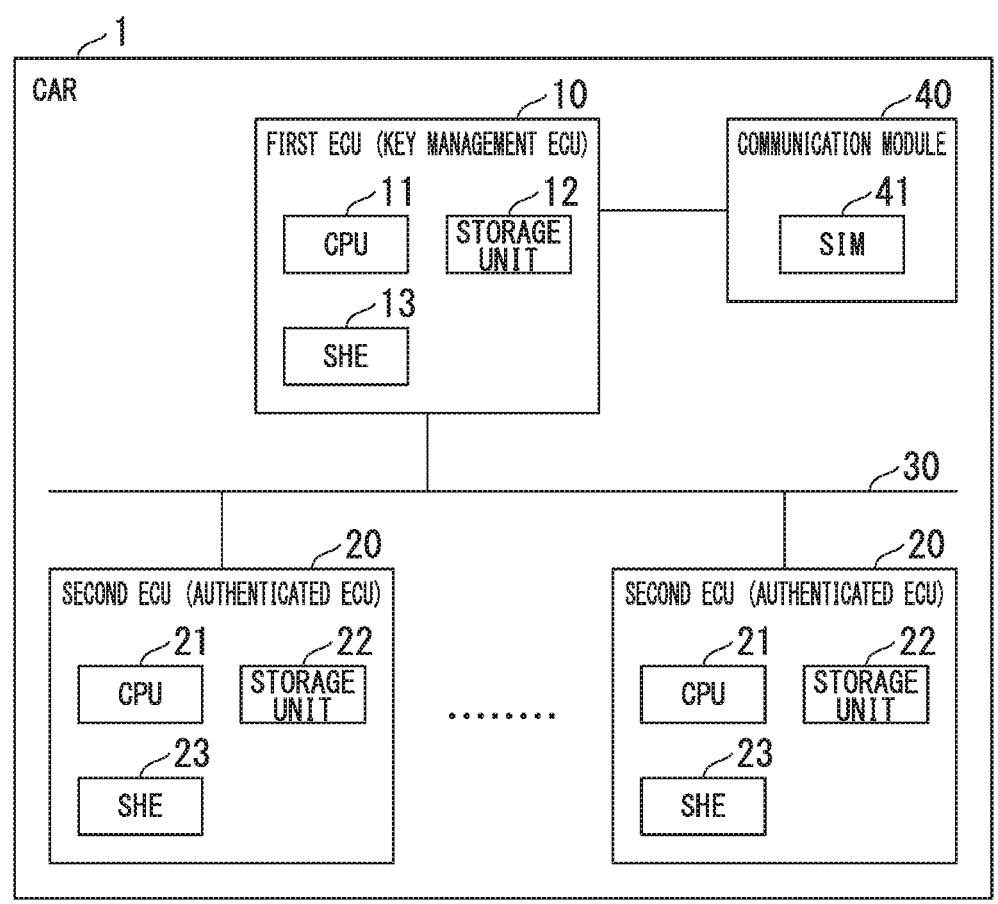
FIG. 11 is a diagram showing a configuration example of an in-vehicle computer system provided in a car according to a third embodiment.

FIG. 11 is a diagram showing a configuration example of an in-vehicle computer system provided in a car 1 according to the present embodiment. In FIG. 11, parts corresponding to those in FIG. 1 are denoted by the same reference numerals, description thereof is omitted. Hereinafter, parts different from the first embodiment will be mainly described.

In the third embodiment, the car 1 includes a communication module 40. The communication module 40 performs wireless communication using a wireless communication network. The communication module 40 includes a subscriber identity module (SIM) 41. The SIM 41 is a SIM to which information for using the wireless communication network is written. By using the SIM 41, the communication module 40 can be connected to the wireless communication network to perform wireless communication.

Also, an embedded subscriber identity module (eSIM) may be used as the SIM 41. The SIM and the eSIM have tamper-resistant properties. The SIM and the eSIM are examples of secure elements. The SIM and the eSIM are types of computers and implement desired functions through a computer program.

The communication module 40 is connected to a first ECU 10. The first ECU 10 exchanges data with the communication module 40.

Although data is exchanged between the first ECU 10 and the communication module 40 by directly connecting the first ECU 10 and the communication module 40 in the configuration of FIG. 11, the present invention is not limited thereto. For example, the communication module 40 may be connected to another device such as an infotainment device provided in the car 1, or may be provided in another device, and the first ECU 10 may exchange data with the communication module 40 via another device, for example, an infotainment device. Alternatively, the communication module 40 may be provided in an external device of the car 1 connected to a diagnostic port of the car 1, for example, a diagnostic port referred to as an on-board diagnostics (OBD) port, and the first ECU 10 may exchange data with the communication module 40 of the external device connected to the diagnostic port via the diagnostic port. Alternatively, the first ECU 10 may include the communication module 40 including the SIM 41.

Also, although the SIM 41 provided in the communication module 40 is used in the present embodiment, an integrated circuit (IC) chip, which has tamper-resistant properties, may be used instead of the SIM. For example, an IC chip incorporated in an IC card may be used. Alternatively, an IC chip mounted on a control module provided in an external maintenance tool of the car 1 connected to the diagnostic port of the car 1 may be used.

In FIG. 11, the first ECU 10 includes a CPU 11, a storage unit 12, and an SHE 13. A second ECU 20 includes a CPU 21, a storage unit 22, and an SHE 23.

Next, an ECU authentication process, a key exchange key distribution process, and a MAC key distribution process according to the present embodiment will be described.

[ECU Authentication Process]

Figure 12:
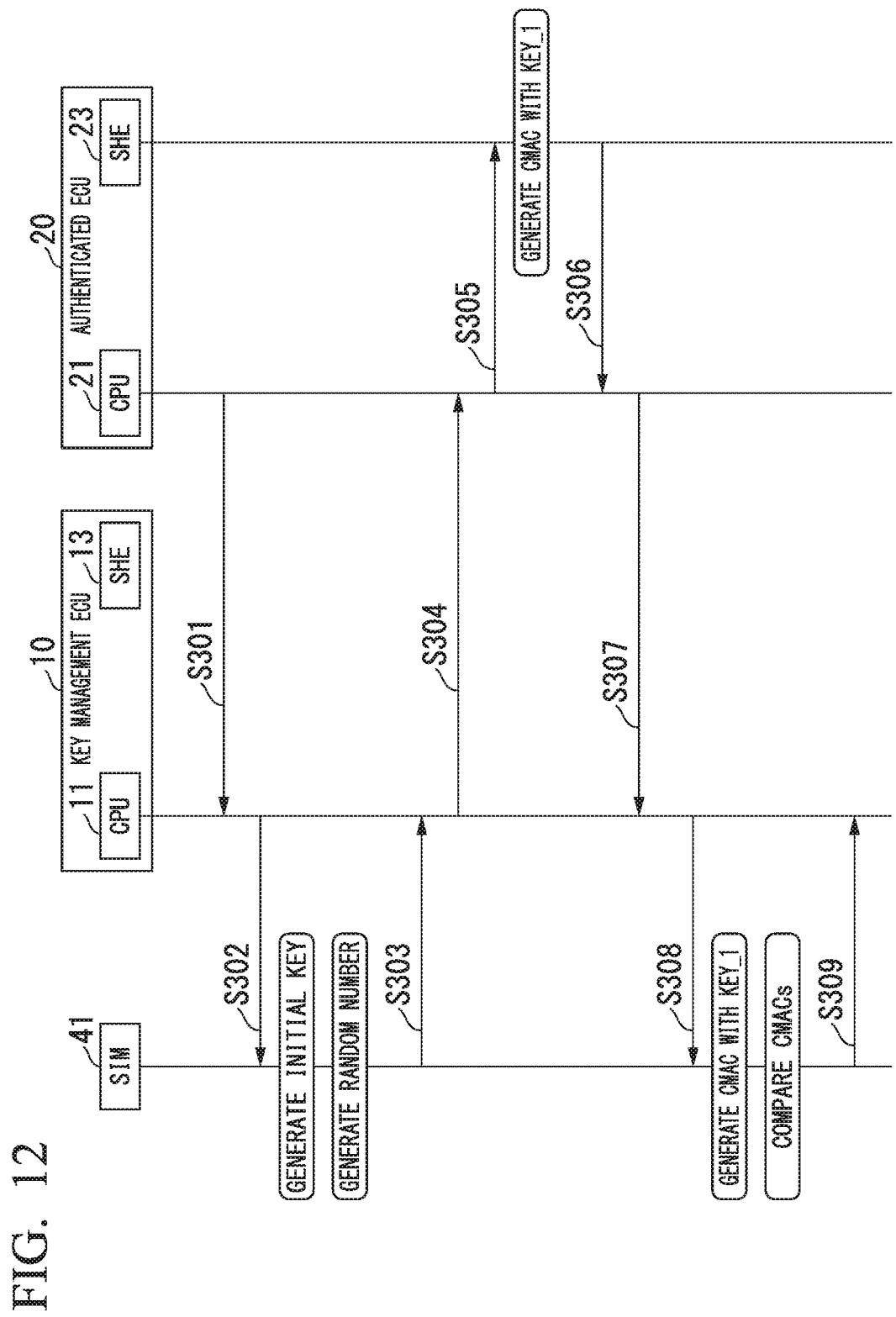
FIG. 12 is a sequence chart showing an ECU authentication method according to the third embodiment.

The ECU authentication process according to the present embodiment will be described with reference to FIG. 12. FIG. 12 is a sequence chart showing the ECU authentication method according to the present embodiment. In the SIM 41 of the communication module 40, a master key MS is preset, for example, when the SIM 41 is manufactured or the like. Because the SIM 41 has relatively robust tamper-resistant properties, the security of the master key MS is high.

The key management ECU 10 exchanges data with the SIM 41 via the communication module 40. Authentication of validity is performed between the key management ECU 10 and the SIM 41. If the authentication of the validity between the key management ECU 10 and the SIM 41 succeeds, data exchange between the key management ECU 10 and the SIM 41 is securely performed. On the other hand, if the authentication of the validity between the key management ECU 10 and the SIM 41 fails, the exchange of data between the key management ECU 10 and the SIM 41 is limited.

(Step S301) In the authenticated ECU 20, the CPU 21 transmits the identifier ECU_ID of its own authenticated ECU 20 to the key management ECU 10.

(Step S302) In the key management ECU 10, the CPU 11 transmits the identifier ECU_ID of the authenticated ECU 20 received from the authenticated ECU 20 to the SIM 41.

(Step S303) The SIM 41 generates an initial key of the authenticated ECU 20 by using the identifier ECU_ID of the authenticated ECU 20 received from the key management ECU 10 and its own stored master key MS. In the generation of the initial key, a CMAC is calculated according to the above Equation (4). The calculated CMAC is the initial key of the authenticated ECU 20 and has the same value as a value set in the KEY_1 key of the SHE 23 of the authenticated ECU 20. The initial key of the authenticated ECU 20 is referred to as an initial key KEY_1. The SIM 41 stores the calculated CMAC, i.e., the initial key KEY_1, in its own memory. Also, the SIM 41 generates a random number rand. The SIM 41 transmits the generated random number rand to the key management ECU 10. The SIM 41 stores the generated random number rand in its own memory.

(Step S304) In the key management ECU 10, the CPU 11 transmits the random number rand received from the SIM 41 to the authenticated ECU 20.

Next, steps S305 to S307 are executed. Steps S305 to S307 are the same as steps S109 to S111 shown in FIG. 2.

(Step S308) In the key management ECU 10, the CPU 11 transmits the identifier ECU_ID of the authenticated ECU 20 and the CMAC received from the authenticated ECU 20 to the SIM 41.

(Step S309) The SIM 41 verifies the CMAC received from the key management ECU 10. In the verification of the CMAC, the SIM 41 calculates the CMAC for the random number rand stored in its own memory by using the initial key KEY_1 stored in its own memory. Next, the SIM 41 compares the calculated CMAC with the CMAC received from the key management ECU 10. If a result of the comparison indicates that the two match, the verification of the CMAC succeeds. On the other hand, if they do not match, the verification of the CMAC fails. The SIM 41 transmits the CMAC verification result "success (OK) or failure (NG)" to the key management ECU 10. If the CMAC verification result received from the SIM 41 is success (OK), the CPU 11 of the key management ECU 10 determines that the authentication of the validity of the authenticated ECU 20 has succeeded. On the other hand, if the CMAC verification result received from the HSM 14 is failure (NG), the CPU 11 of the key management ECU 10 determines that the authentication of the validity of the authenticated ECU 20 has failed.

[Key Exchange Key Distribution Process]

Figure 13:
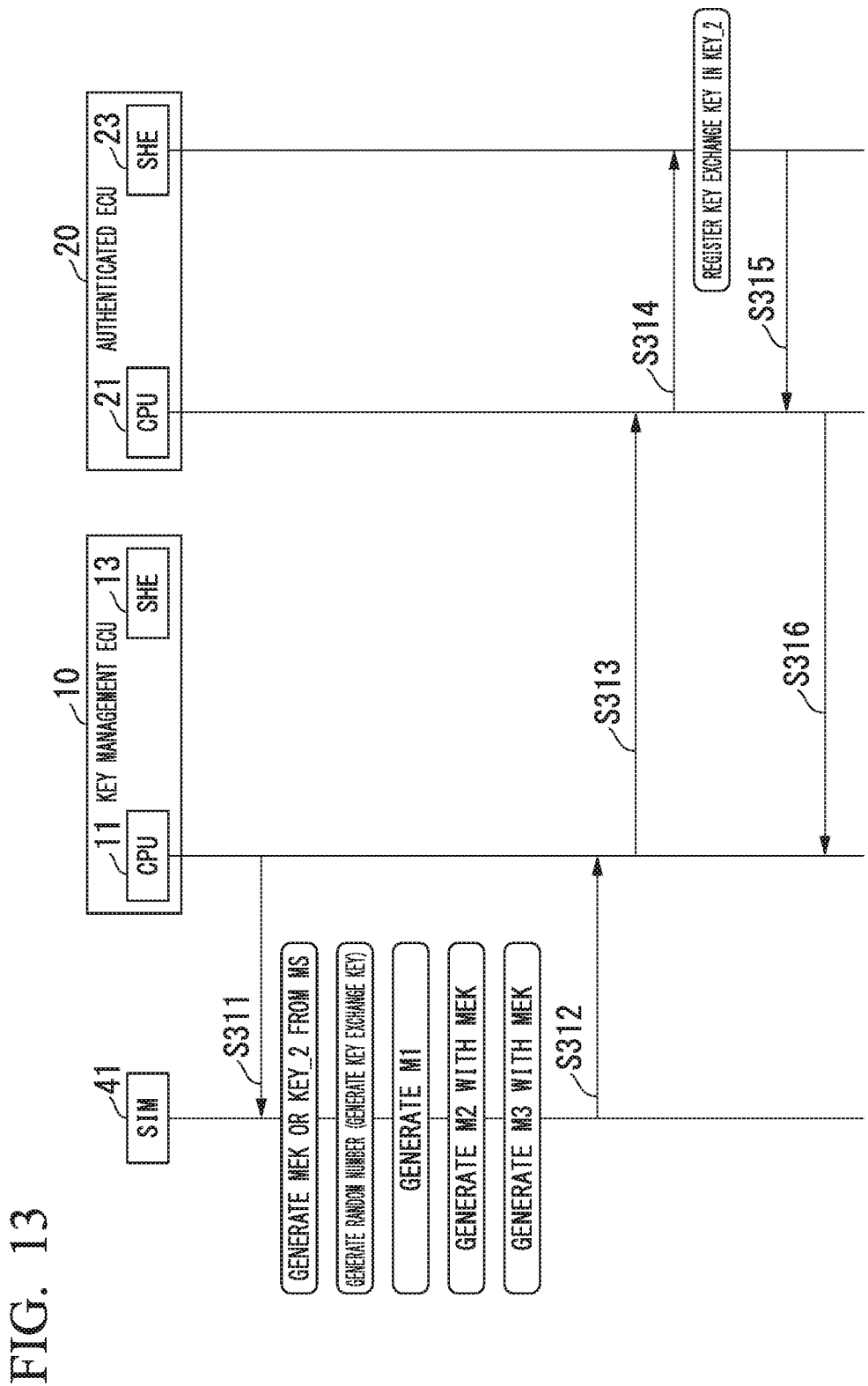
FIG. 13 shows a key exchange key distribution process according to the third embodiment.

The key exchange key distribution process according to the present embodiment will be described with reference to FIG. 13. FIG. 13 is a sequence chart showing the key exchange key distribution method according to the present embodiment. In the present embodiment, as in the first embodiment, a first key exchange key (a key used for an encryption process and a decryption process) and a second key exchange key (a key used for a generation process and a verification process for a MAC) are used.

Hereinafter, a case in which the first key exchange key is delivered will be described with reference to FIG. 13 as an example. Also, a case in which the second key exchange key is distributed is similar to the case in which the first key exchange key is distributed.

(Step S311) In the key management ECU 10, the CPU 11 transmits a key exchange key creation request (ECU_ID) to the SIM 41 by using the identifier ECU_ID of the authenticated ECU 20 serving as a distribution destination of the key exchange key.

(Step S312) The SIM 41 generates values M1, M2, and M3. The values M1, M2, and M3 are values for registering the first key exchange key in a KEY_2 key of the SHE 23 of the authenticated ECU 20. The SIM 41 generates an MEK key from the master key MS. The SIM 41 generates a random number and uses the generated random number as the first key exchange key. The SIM 41 may generate the first key exchange key from the master key MS. The SIM 41 stores the first key exchange key in its own memory. The SIM 41 transmits the generated values M1, M2, and M3 to the key management ECU 10.

(Step S313) In the key management ECU 10, the CPU 11 transmits the values M1, M2, and M3 received from the SIM 41 to the authenticated ECU 20. The CPU 11 uses the values M1, M2, and M3 received from the SIM 41 to generate data (an encrypted first key exchange key) obtained by encrypting the first key exchange key with a KEY_9 key of an SHE 13 through the SHE 13. The CPU 11 stores the encrypted first key exchange key generated by the SHE 13 in the storage unit 12.

Next, steps S314 to S316 are executed. Steps S314 to S316 are the same as steps S128 to S130 shown in FIG. 3.

Also, the key exchange key distribution process of the first embodiment shown in FIG. 3 can be applied to second and subsequent first key exchange key distributions. This is because the key management ECU 10 can generate the values M1, M2, and M3 by using the first key exchange key set in initial first key exchange key distribution according to the key exchange key distribution process of the present embodiment shown in FIG. 13 in the second and subsequent first key exchange key distributions. This can also be similarly applied to a case in which the second key exchange key is distributed.

[MAC Key Distribution Process]

The MAC key distribution process of the first embodiment shown in FIGS. 4 and 5 can be applied to a MAC key distribution process according to the third embodiment.

Fourth Embodiment

Figure 14:
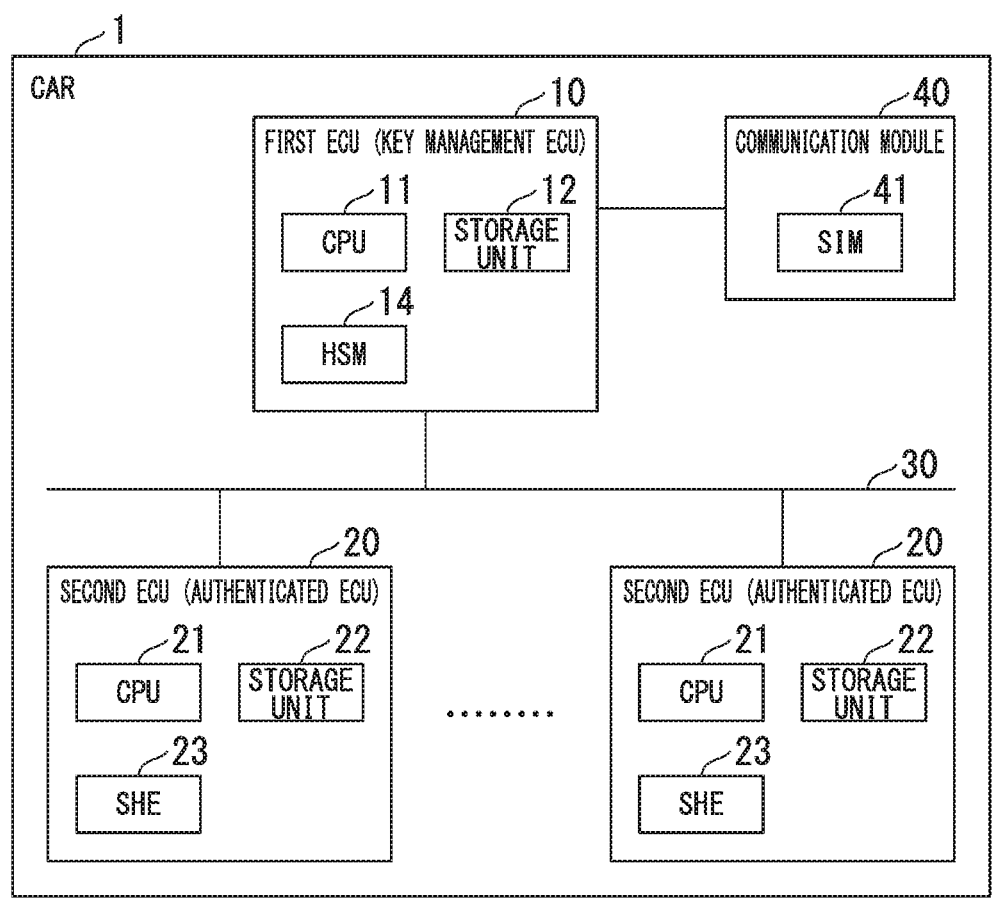
FIG. 14 is a diagram showing a configuration example of an in-vehicle computer system provided in a car according to a fourth embodiment.

FIG. 14 is a diagram showing a configuration example of an in-vehicle computer system provided in a car 1 according to the present embodiment. In FIG. 11, parts corresponding to those in FIG. 6 are denoted by the same reference numerals, description thereof will be omitted. Hereinafter, parts different from the second embodiment will be mainly described.

In the fourth embodiment, the car 1 includes a communication module 40. The communication module 40 performs wireless communication using a wireless communication network. The communication module 40 includes a SIM 41. The SIM 41 is a SIM to which information for using the wireless communication network is written. By using the SIM 41, the communication module 40 can be connected to the wireless communication network to perform wireless communication.

Also, an eSIM may be used as the SIM 41. The SIM and the eSIM have tamper-resistant properties. The SIM and the eSIM are examples of secure elements. The SIM and the eSIM are types of computers and implement desired functions through a computer program.

The communication module 40 is connected to a first ECU 10. The first ECU 10 exchanges data with the communication module 40.

Although data is exchanged between the first ECU 10 and the communication module 40 by directly connecting the first ECU 10 and the communication module 40 in the configuration of FIG. 14, the present invention is not limited thereto. For example, the communication module 40 may be connected to another device such as an infotainment device provided in the car 1, or may be provided in another device, and the first ECU 10 may exchange data with the communication module 40 via another device, for example, an infotainment device. Alternatively, the communication module 40 may be provided in an external device of the car 1 connected to a diagnostic port of the car 1, for example, a diagnostic port referred to as an OBD port, and the first ECU 10 may exchange data with the communication module 40 of the external device connected to the diagnostic port via the diagnostic port. Alternatively, the first ECU 10 may include the communication module 40 including the SIM 41.

Also, although the SIM 41 provided in the communication module 40 is used in the present embodiment, an IC chip, which has tamper-resistant properties, may be used instead of the SIM. For example, an IC chip incorporated in an IC card may be used. Alternatively, an IC chip mounted on a control module provided in an external maintenance tool of the car 1 connected to the diagnostic port of the car 1 may be used.

In FIG. 14, the first ECU 10 includes a CPU 11, a storage unit 12, and an HSM 14. A second ECU 20 includes a CPU 21, a storage unit 22, and an SHE 23.

Next, an ECU authentication process, a key exchange key distribution process, and a MAC key distribution process according to the present embodiment will be described.

[ECU Authentication Process]

Figure 15:
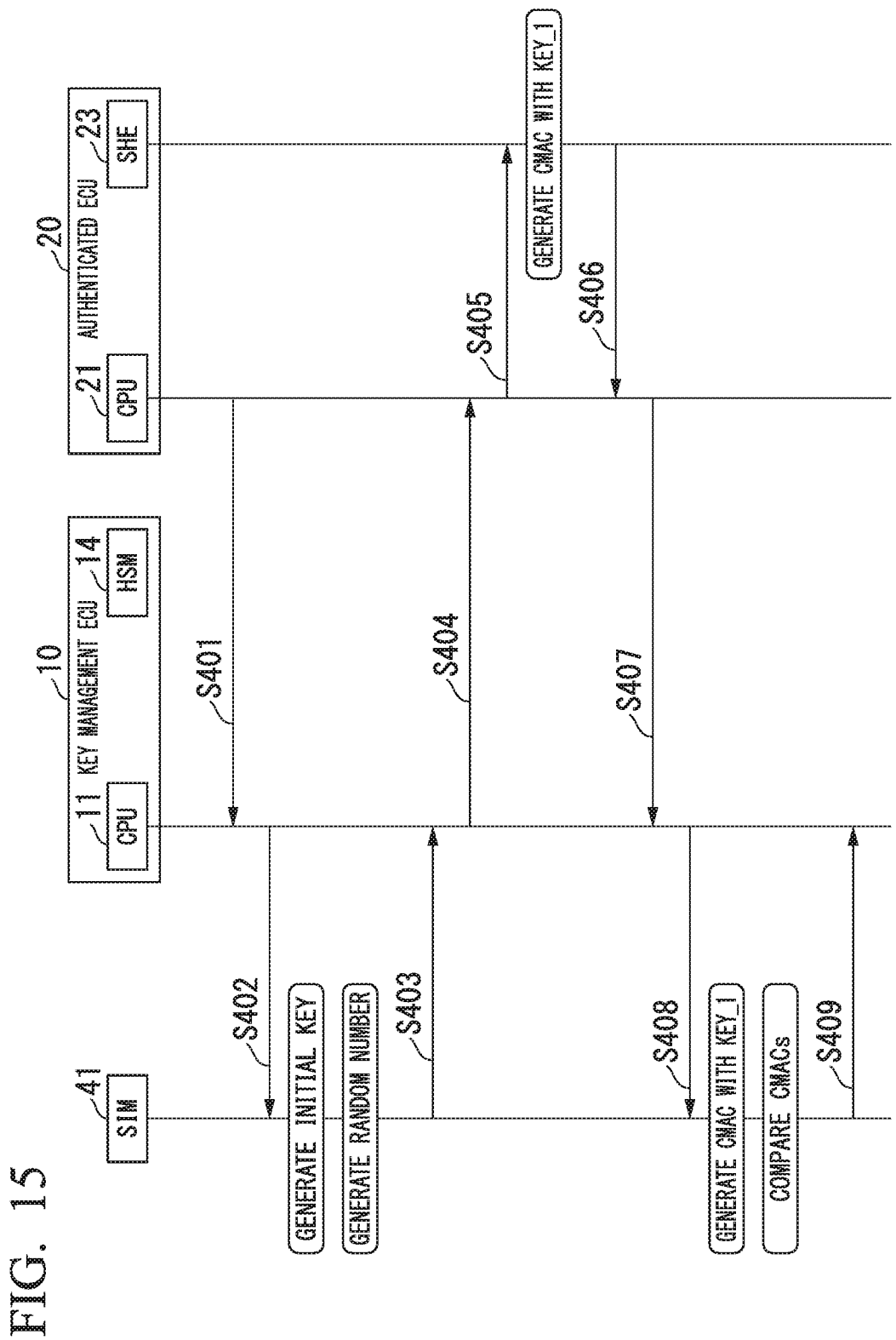
FIG. 15 is a sequence chart showing an ECU authentication method according to the fourth embodiment.

The ECU authentication process according to the present embodiment will be described with reference to FIG. 15. FIG. 15 is a sequence chart showing the ECU authentication method according to the present embodiment. In the SIM 41 of the communication module 40, a master key MS is preset, for example, when the SIM 41 is manufactured or the like. Because the SIM 41 has relatively robust tamper-resistant properties, the security of the master key MS is high.

The key management ECU 10 exchanges data with the SIM 41 via the communication module 40. Authentication of validity is performed between the key management ECU 10 and the SIM 41. If the authentication of the validity between the key management ECU 10 and the SIM 41 succeeds, data exchange between the key management ECU 10 and the SIM 41 is securely performed. On the other hand, if the authentication of the validity between the key management ECU 10 and the SIM 41 fails, the exchange of data between the key management ECU 10 and the SIM 41 is limited.

(Step S401) In the authenticated ECU 20, the CPU 21 transmits the identifier ECU_ID of its own authenticated ECU 20 to the key management ECU 10.

(Step S402) In the key management ECU 10, the CPU 11 transmits the identifier ECU_ID of the authenticated ECU 20 received from the authenticated ECU 20 to the SIM 41.

(Step S403) The SIM 41 generates an initial key of the authenticated ECU 20 by using the identifier ECU_ID of the authenticated ECU 20 received from the key management ECU 10 and its own stored master key MS. In the generation of the initial key, a CMAC is calculated according to the above Equation (4). The calculated CMAC is the initial key of the authenticated ECU 20 and has the same value as a value set in the KEY_1 key of the SHE 23 of the authenticated ECU 20. The initial key of the authenticated ECU 20 is referred to as an initial key KEY_1. The SIM 41 stores the calculated CMAC, i.e., the initial key KEY_1, in its own memory. Also, the SIM 41 generates a random number rand. The SIM 41 transmits the generated random number rand to the key management ECU 10. The SIM 41 stores the generated random number rand in its own memory.

(Step S404) In the key management ECU 10, the CPU 11 transmits the random number rand received from the SIM 41 to the authenticated ECU 20.

Next, steps S405 to S407 are executed. Steps S405 to S407 are the same as steps S205 to S207 shown in FIG. 7.

(Step S408) In the key management ECU 10, the CPU 11 transmits the identifier ECU_ID of the authenticated ECU 20 and the CMAC received from the authenticated ECU 20 to the SIM 41.

(Step S409) The SIM 41 verifies the CMAC received from the key management ECU 10. In the verification of the CMAC, the SIM 41 calculates the CMAC for the random number rand stored in its own memory by using the initial key KEY_1 stored in its own memory. Next, the SIM 41 compares the calculated CMAC with the CMAC received from the key management ECU 10. If a result of the comparison indicates that the two match, the verification of the CMAC succeeds. On the other hand, if they do not match, the verification of the CMAC fails. The SIM 41 transmits the CMAC verification result "success (OK) or failure (NG)" to the key management ECU 10. If the CMAC verification result received from the SIM 41 is success (OK), the CPU 11 of the key management ECU 10 determines that the authentication of the validity of the authenticated ECU 20 has succeeded. On the other hand, if the CMAC verification result received from the HSM 14 is failure (NG), the CPU 11 of the key management ECU 10 determines that the authentication of the validity of the authenticated ECU 20 has failed.

[Key Exchange Key Distribution Process]

Figure 16:
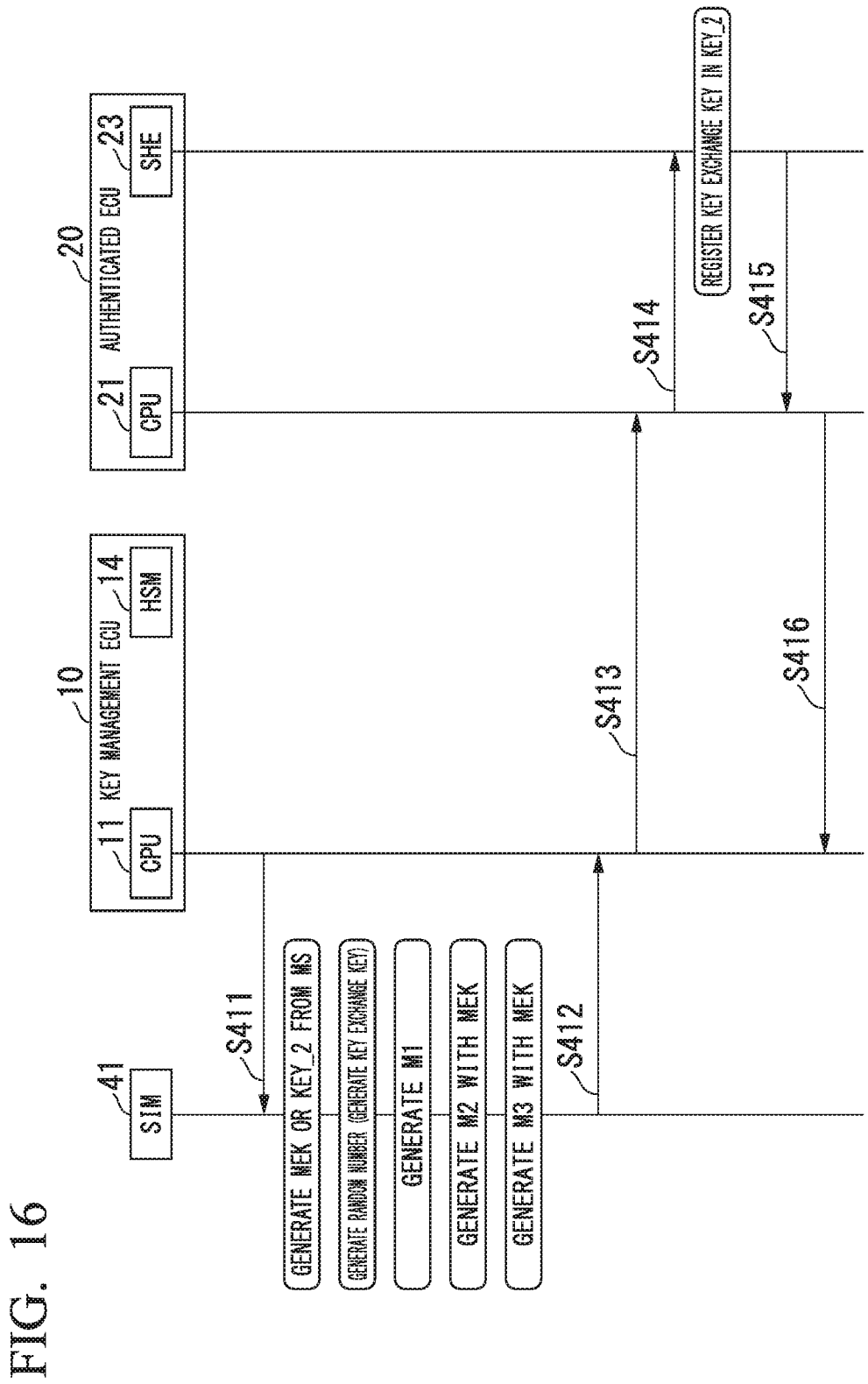
FIG. 16 is a sequence chart showing a key exchange key distribution method according to the fourth embodiment.
Figure 17:
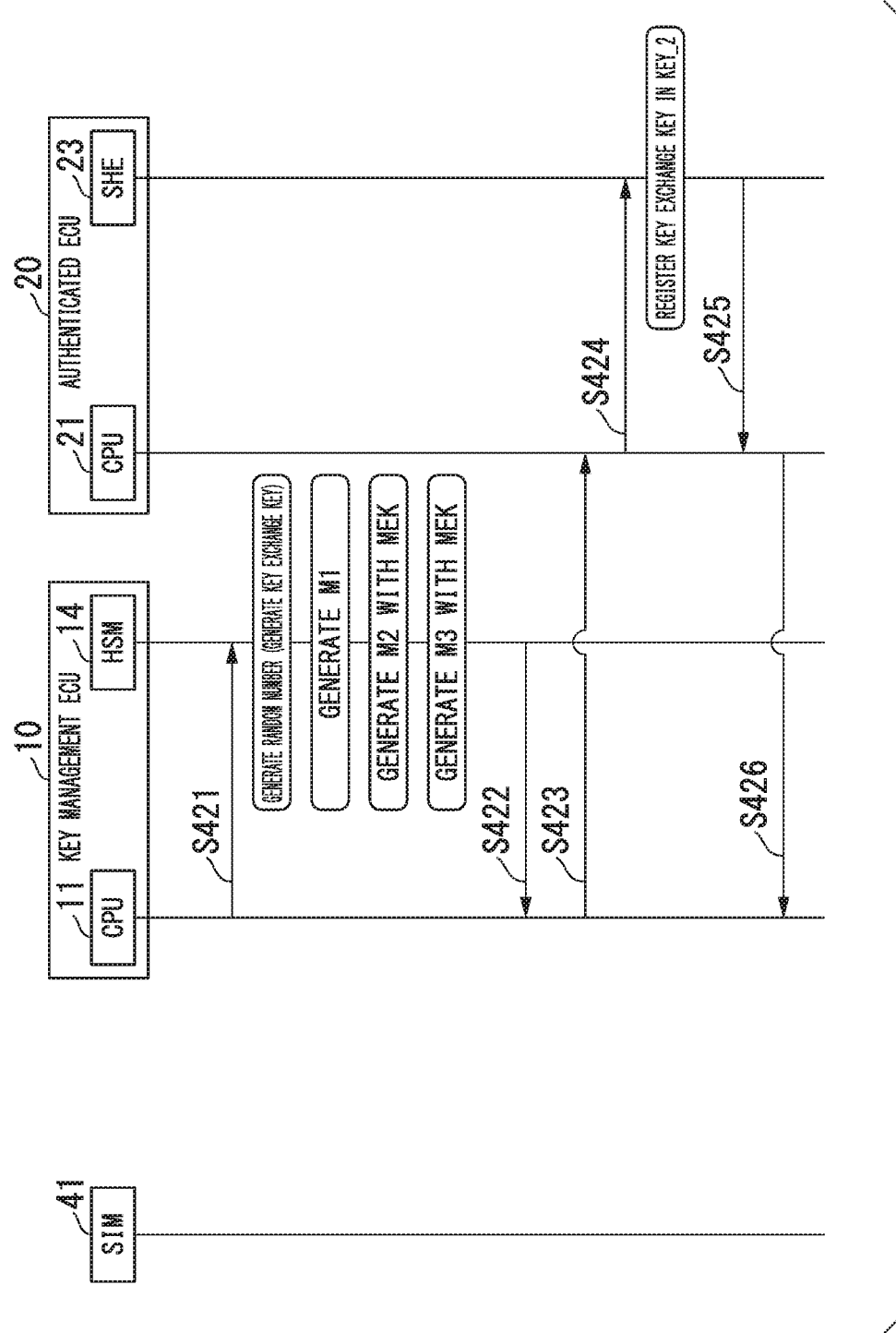
FIG. 17 is a sequence chart showing a key exchange key distribution method according to the fourth embodiment.

The key exchange key distribution process according to the present embodiment will be described with reference to FIGS. 16 and 17. FIGS. 16 and 17 are sequence charts showing the key exchange key distribution method according to the present embodiment. In the present embodiment, as in the second embodiment, a first key exchange key (a key used for an encryption process and a decryption process) and a second key exchange key (a key used for a generation process and a verification process for the MAC) are used.

Hereinafter, a case in which the first key exchange key is delivered will be described with reference to FIGS. 16 and 17 as an example. Also, a case in which the second key exchange key is distributed is similar to the case in which the first key exchange key is distributed. First, initial first key exchange key distribution will be described with reference to FIG. 16.

(Step S411) In the key management ECU 10, the CPU 11 transmits a key exchange key creation request (ECU_ID) to the SIM 41 by using the identifier ECU_ID of the authenticated ECU 20 serving as a distribution destination of the key exchange key.

(Step S412) The SIM 41 generates values M1, M2, and M3. The values M1, M2, and M3 are values for registering the first key exchange key in a KEY_2 key of the SHE 23 of the authenticated ECU 20. The SIM 41 generates an MEK key from the master key MS. The SIM 41 generates a random number and uses the generated random number as the first key exchange key. The SIM 41 may generate the first key exchange key from the master key MS. The SIM 41 stores the first key exchange key in its own memory. The SIM 41 transmits the generated values M1, M2, and M3 to the key management ECU 10.

(Step S413) In the key management ECU 10, the CPU 11 transmits the values M1, M2, and M3 received from the SIM 41 to the authenticated ECU 20. The CPU 11 causes the HSM 14 to acquire the first key exchange key by using the values M1, M2, and M3 received from the SIM 41. The HSM 14 stores the first key exchange key in its own memory.

Next, steps S414 to S416 are executed. Steps S414 to S416 are the same as steps S214 to S216 shown in FIG. 8.

Also, the key exchange key distribution process shown in FIG. 17 can be applied to second and subsequent first key exchange key distributions. This is because the key management ECU 10 can generate the values M1, M2, and M3 by using the first key exchange key set in initial first key exchange key distribution according to the key exchange key distribution process of the present embodiment shown in FIG. 16 in the second and subsequent first key exchange key distributions. This can also be similarly applied to a case in which the second key exchange key is distributed. The second and subsequent first key exchange key distributions will be described with reference to FIG. 17.

(Step S421) In the key management ECU 10, the CPU 11 inputs a key exchange key creation request to the HSM 14.

(Step S422) In the key management ECU 10, the HSM 14 generates the values M1, M2, and M3. The values M1, M2, and M3 are values for registering a new first key exchange key in the KEY_2 key of the SHE 23 of the authenticated ECU 20. The HSM 14 generates a random number and uses the generated random number as a new first key exchange key. The HSM 14 stores the new first key exchange key in its own memory. The HSM 14 outputs the generated values M1, M2, and M3 to the CPU 11.

(Step S423) In the key management ECU 10, the CPU 11 transmits the values M1, M2, and M3 received from the HSM 14 to the authenticated ECU 20.

Next, steps S424 to S426 are executed. Steps S424 to S426 are the same as steps S214 to S216 shown in FIG. 8.

[MAC Key Distribution Process]

The MAC key distribution process of the second embodiment shown in FIGS. 9 and 10 can be applied to a MAC key distribution process according to the fourth embodiment.

According to each of the above-described embodiments, it is possible to execute a cipher processing procedure according to the cipher processing chip (the SHE or the HSM) provided in the first ECU 10 and the second ECU 20. Thereby, it is possible to improve the security of data in the in-vehicle control system of the car 1.

[Key Management Method]

An example of a key management method will be described.

(Key Management Unit)

(1) Initial key (1-a) Unit of ECU

When an initial key being different for each ECU is provided, the influence of leakage of a certain initial key is small. On the other hand, because the initial key of each ECU is shared with the key management ECU 10, the key management cost becomes high.

(1-b) Common to all ECUs

When all ECUs have a common initial key, the influence is significant when the initial key is leaked. On the other hand, the key management cost becomes low.

(2) Key exchange key (2-a) Unit of ECU

If a key exchange key being different for each ECU is provided, the MAC key is distributed by using the individual key exchange key for each ECU, so that the time required for distributing the MAC key becomes longer. On the other hand, when the key exchange key is leaked, the influence is small.

(2-b) Common to all ECUs

When all the ECUs have a common key exchange key, the same key exchange key can be used in one car to commonly distribute the MAC key to all the ECUs, so that the time required for distributing the MAC key can be shortened. On the other hand, if the key exchange key is leaked, the influence is significant.

(2-c) Unit of car

If a key exchange key being different for each car is provided, the same key exchange key can be used in one car to distribute the MAC key in common to all the ECUs, so that the time required for distributing the MAC key can be shortened. Also, an influence when the key exchange key is leaked is small because it stays within the range of one car.

(3) MAC key (3-a) Common to all ECUs

If all ECUs have a common MAC key, the influence is significant when the MAC key is leaked.

(3-b) Unit of car

If a MAC key being different for each car is provided, an influence when the MAC key is leaked is small because it stays within the range of one car.

(Initial Key Generation Method)

The initial key is used to authenticate the validity of the ECU. Thus, in consideration of the influence of leakage of the initial key, it is preferable to provide an initial key being different for each ECU so that the initial key can be managed in units of ECUs. In this case, a method of sharing the initial key between the key management ECU 10 and each authenticated ECU 20 is a problem. An example of an initial key generation method for solving the problem will be described hereinafter.

A method of generating an initial key by using a master key (MASTER_SECRET: MS) will be described.

The initial key is calculated according to the following equation using the master key MS and the identifier ECU_ID of the authenticated ECU.

Initial key=digest (MS, ECU_ID)

The digest is, for example, a CMAC. Alternatively, the digest is, for example, an exclusive OR operation. The initial key has a value being different for each ECU. Also, because the master key MS is securely stored in the key management ECU 10 or the SIM 41, leakage of the initial key can be prevented. For example, the key management ECU 10 securely stores the master key MS, so that the key management ECU 10 can acquire the identifier ECU_ID of the authenticated ECU 20 to generate an initial key of the authenticated ECU 20 and securely share the generated initial key with the authenticated ECU 20.

An initial key writing device is provided in an ECU vendor. The initial key writing device includes a master key MS, generates an initial key of the authenticated ECU 20 by using the master key MS and the input identifier ECU_ID of the authenticated ECU 20, and writes the generated initial key to the authenticated ECU 20. In the initial key writing device, the master key MS is securely stored.

The master key writing device is provided in an ECU vendor of the key management ECU 10 in which the master key MS is set, a SIM vendor of the SIM 41 in which the master key MS is set, and a vendor of an IC card having an IC chip in which the master key MS is set or the like. The master key writing device generates the master key MS and writes the generated master key MS to a written device. In the master key writing device, the master key MS is securely generated and stored.

The master key MS is calculated according to, for example, the following equation.

MS=A xor B xor C

Here, "A xor B" is an exclusive OR operation of a value A and a value B.

In the master key writing device, separately inputting values A, B, and C is included in the generation condition of the master key MS. For example, the master key writing device generates the master key MS only when different values A, B, and C are input separately according to different user IDs whose validities have been authenticated. Thus, leakage of the master key MS can be prevented. Also, the calculation equation of the master key MS is not limited to the above exclusive OR operation. The calculation equation of the master key MS may be any calculation equation capable of being generated only when all of a plurality of values, for example, the values A, B, and C, are obtained.

Also, the ECU vendor may acquire a list of identifiers ECU_ID of ECUs from an ECU manufacturer, generate a list of initial keys corresponding to the identifiers ECU_ID, and provide the ECU manufacturer with the generated list of initial keys.

In the above example of the initial key generation method, if the initial key is leaked, it is possible to impersonate the authenticated ECU 20 by illegally setting the leaked initial key to the ECU. Thus, the initial key of the authenticated ECU 20 once authenticated after being mounted on the car 1 may be erased from the authenticated ECU 20. Thereby, it is possible to prevent the initial key from being leaked from the second ECU 20 detached from the car 1, for example, through the replacement of the second ECU 20. Also, a management server for managing the authentication result of the authenticated ECU 20 may be provided so that an authentication state of the authenticated ECU 20 can be ascertained by a management server.

Fifth Embodiment

Figure 18:
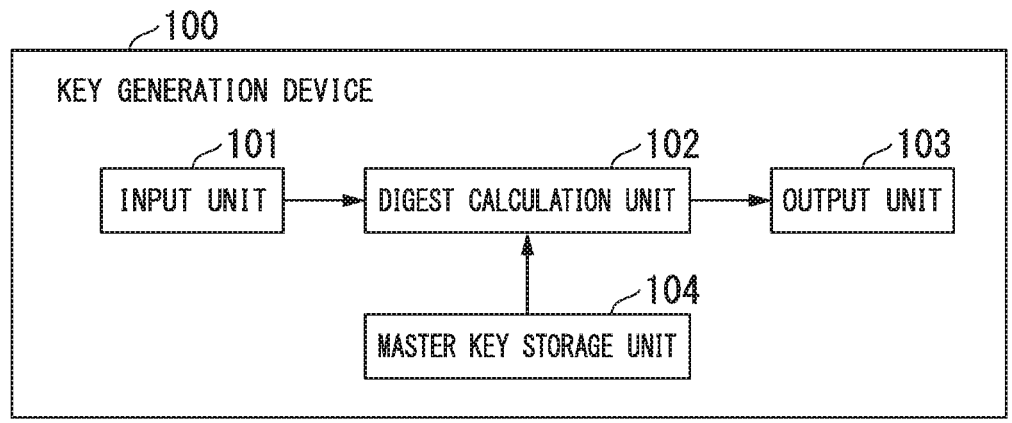
FIG. 18 is a diagram showing a configuration example of a key generation device according to a fifth embodiment.

FIG. 18 is a diagram showing a configuration example of a key generation device 100 according to the present embodiment. In FIG. 18, the key generation device 100 includes an input unit 101, a digest calculation unit 102, an output unit 103, and a master key storage unit 104. The input unit 101 inputs information used for key generation. The master key storage unit 104 stores a master key used for key generation. The digest calculation unit 102 calculates a digest by using the information input by the input unit 101 and the master key stored in the master key storage unit 104. The output unit 103 outputs the digest (key) calculated by the digest calculation unit 102.

In the present embodiment, the key generation device 100 calculates a key by the following equation.

Key=digest (master key, ECU identifier, N_key)

Here, the master key is a master key stored in the master key storage unit 104. The ECU identifier is the identifier of the ECU in which the key is stored. N_key is a variable indicating a type of key. Examples of the digest are a value calculated according to a hash function, a value calculated according to an exclusive OR operation, a CMAC, and the like.

Figure 19:
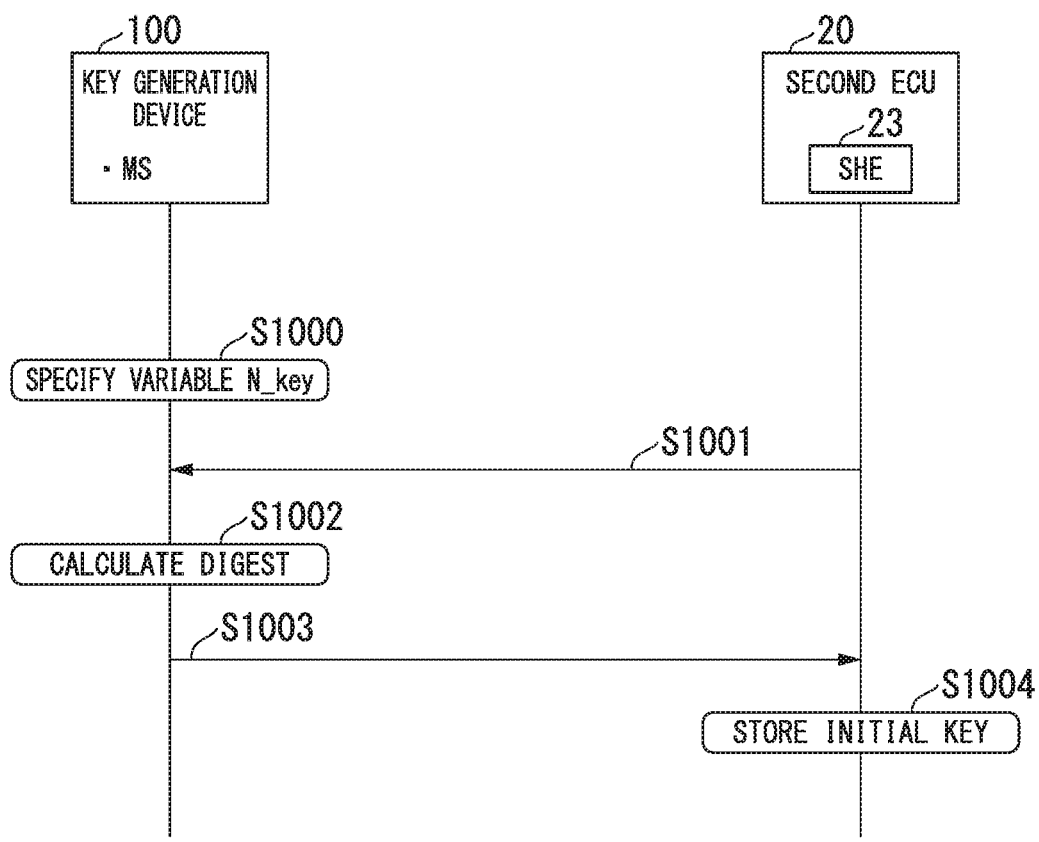
FIG. 19 is a sequence chart showing an example of a key generation method according to the fifth embodiment.

Next, a key generation method according to the present embodiment will be described with reference to FIG. 19. FIG. 19 is a sequence chart showing an example of the key generation method according to the present embodiment. In FIG. 19, an example of a procedure for generating a key (an initial key) to be initially set for the SHE 23 of the second ECU 20 is shown. Here, for the SHE 23 of the second ECU 20, the value $K_{MASTER\_ECU\_KEY}$ among values shown in the above Equation (2) is initially set to the MEK key, the value $K_{BOOT\_MAC\_KEY}$ is initially set to the BMK key, and the value $K_{KEY<N>}$ is initially set to the KEY_N key. The master key storage unit 104 of the key generation device 100 stores the master key MS in advance.

For example, the procedure of the key generation method of FIG. 19 may be applied to the second ECU 20 mounted on the car 1 in a car manufacturing process, for example, in a vehicle manufacturing factory. Here, as an example, the key generation device 100 communicates with the car 1 in a wired or wireless mode and transmits and receives data to and from the second ECU 20 mounted on the car 1.

(Step S1000) The input unit 101 of the key generation device 100 receives a specified variable N_key. In this example, a variable N_key representing the MEK key is a character string $C_{MASTER\_ECU\_KEY}$. A variable N_key representing the BMK key is a character string $C_{BOOT\_MAC\_KEY}$. A variable N_key representing the KEY_N key is a character string $C_{KEY\_N}$. One or more variables N_key may be specified. The key generation device 100 generates a key for the specified variable N_key. Also, the variable N_key of the type of key to be generated may be previously specified with respect to the key generation device 100.

(Step S1001) The input unit 101 of the key generation device 100 acquires an ECU identifier ECUID of the second ECU 20 to store the initial key. Also, the ECU identifier ECUID of the second ECU 20 in which the initial key is going to be stored may be preset for the key generation device 100.

(Step S1002) The digest calculation unit 102 of the key generation device 100 calculates "digest (MS, ECUID, N_key)" by using the master key MS stored in the master key storage unit 104, the ECU identifier ECUID of the second ECU 20 in which the initial key is going to be stored, and the specified variable N_key.

(Step S1003) The output unit 103 of the key generation device 100 outputs "digest (MS, ECUID, N_key)" calculated by the digest calculation unit 102 as a type of initial key indicated by the variable N_key. The second ECU 20 receives the output initial key.

(Step S1004) The second ECU 20 stores the initial key received from the key generation device 100 in the SHE 23 as a corresponding type of key of the SHE 23.

Also, the initial key may also be generated and set for the SHE 13 of the first ECU 10 as in the second ECU 20 described above.

According to the fifth embodiment, it is possible to flexibly generate a plurality of types of keys from the same master key and an ECU identifier by changing the variable N_key.

Although embodiments of the present invention have been described above with reference to the drawings, specific configurations are not limited to the embodiments, and design changes and the like may also be included without departing from the scope of the present invention.

Although a car is an exemplary example of a vehicle in the embodiment described above, the present invention is also applicable to other vehicles other than a car such as a motorized bicycle or a railway vehicle.

Also, processes may be performed by recording a computer program for implementing functions of the device described above on a computer-readable recording medium and causing a computer system to read and execute the program recorded on the recording medium. Also, the "computer system" described here may include an operating system (OS) and hardware such as peripheral devices.

Also, the "computer-readable recording medium" refers to a storage device including a flexible disk, a magneto-optical disc, a read only memory (ROM), a writable non-volatile memory such as a flash memory, a portable medium such as a digital versatile disc (DVD), and a hard disk embedded in the computer system.

Furthermore, the "computer-readable recording medium" is assumed to include a medium that holds a program for a fixed period of time, such as a volatile memory (for example, a dynamic random access memory (DRAM)) inside a computer system serving as a server or a client when the program is transmitted via a network such as the Internet or a communication circuit such as a telephone circuit.

Also, the above-described program may be transmitted from a computer system storing the program in a storage device or the like via a transmission medium or transmitted to another computer system by transmission waves in a transmission medium. Here, the "transmission medium" for transmitting the program refers to a medium having a function of transmitting information, such as a network (a communication network) like the Internet or a communication circuit (a communication line) like a telephone circuit.

Also, the above-described program may be a program for implementing some of the above-described functions.

Further, the above-described program may be a program capable of implementing the above-described functions in combination with a program already recorded on the computer system, i.e., a so-called differential file (differential program).

INDUSTRIAL APPLICABILITY

The present invention can also be applied for improving the security of data.

REFERENCE SIGNS LIST

1 Car
10 First ECU (key management ECU)
11, 21 CPU
12, 22 Storage unit
13, 23 SHE
14 HSM
20 Second ECU (authenticated ECU)
30 CAN
40 Communication module
41 SIM
100 Key generation device
101 Input unit
102 Digest calculation unit
103 Output unit
104 Master key storage unit

The invention claimed is:

1. An in-vehicle computer system provided in a vehicle, the in-vehicle computer system comprising:
   a first in-vehicle computer including a first arithmetic processing device, a first secure hardware extension (SHE), and a first storage; and
   a second in-vehicle computer including a second arithmetic processing device, a second SHE, and a second storage,
   wherein the first in-vehicle computer and the second in-vehicle computer are connected to a communication network provided in the vehicle,
   wherein an initial key is set to a KEY_N key usable in a generation process and a verification process for a message authentication code in the second SHE,
   wherein a master key is set to a KEY_N key usable in the generation process and the verification process for the message authentication code in the first SHE, the master key being used together with an identifier of the second in-vehicle computer for generating the message authentication code to be used as the initial key,
   wherein the first arithmetic processing device is configured to cause the message authentication code for the identifier of the second in-vehicle computer received from the second in-vehicle computer to be generated using the master key through the first SHE,
   wherein the first arithmetic processing device is further configured to execute a process of authenticating validity of the second in-vehicle computer by using the generated message authentication code,
   wherein the first arithmetic processing device is further configured to cause a MASTER_ECU_KEY (MEK) key of the second SHE to be generated using the master key through the first SHE,
   wherein the first arithmetic processing device is further configured to cause a key registration message for registering a key exchange key in another KEY_N key usable in an encryption process and a decryption process of the second SHE or the KEY_N key usable in the generation process and the verification process for the message authentication code of the second SHE to be generated using the MEK key through the first SHE and transmit the key registration message to the second in-vehicle computer,
   wherein the second arithmetic processing device is configured to register the key exchange key in the second SHE according to the key registration message,
   wherein the first arithmetic processing device is further configured to cause a key registration message for registering a message authentication code (MAC) key in a RAM_KEY key of the second SHE to be generated using the key exchange key through the first SHE and transmit the key registration message to the second in-vehicle computer, and
   wherein the second arithmetic processing device is further configured to register the MAC key in the second SHE according to the key registration message.

2. The in-vehicle computer system according to claim 1,
   wherein the second storage stores the key registration message for registering the MAC key in the RAM_KEY key of the second SHE in a non-volatile memory,
   wherein the second arithmetic processing device is further configured to register the MAC key in the second SHE according to the key registration message stored in the non-volatile memory, and
   wherein the first in-vehicle computer and the second in-vehicle computer are further configured to execute a validity authentication process based on the MAC key registered in the RAM_KEY key of the second SHE according to the key registration message stored in the non-volatile memory.

3. A management method for use in an in-vehicle computer system provided in a vehicle, the management method comprising:
   a message authentication code generation step;
   an authentication step;
   a MASTER_ECU_KEY (MEK) key generation step;
   a first transmission step;
   a key exchange key registration step;
   a second transmission step; and
   a message authentication code (MAC) key registration step,
   wherein the in-vehicle computer system includes:
      a first in-vehicle computer including a first arithmetic processing device, a hardware security module (HSM), and a first storage; and
      a second in-vehicle computer including a second arithmetic processing device, a secure hardware extension (SHE), and a second storage,
   wherein the first in-vehicle computer and the second in-vehicle computer are connected to a communication network provided in the vehicle,
   wherein an initial key is set to a KEY_N key usable in a generation process and a verification process for a message authentication code in the SHE,
   wherein, in the message authentication code generation step, the first arithmetic processing device causes the message authentication code for an identifier of the second in-vehicle computer received from the second in-vehicle computer to be generated through a secure element storing a master key used together with the identifier of the second in-vehicle computer for generating the message authentication code to be used as the initial key,
   wherein, in the authentication step, the first arithmetic processing device causes the secure element to execute a process of authenticating validity of the second in-vehicle computer using the generated message authentication code,
   wherein, in the MEK key generation step, the first arithmetic processing device causes a MEK key of the SHE to be generated using the master key through the secure element,
   wherein, in the first transmission step, the first arithmetic processing device causes a key registration message for registering a key exchange key in another KEY_N key usable in an encryption process and a decryption process of the SHE or the KEY_N key usable in the generation process and the verification process for the message authentication code of the SHE to be generated using the MEK key through the secure element and transmits the key registration message to the second in-vehicle computer,
   wherein, in the key exchange key registration step, the second arithmetic processing device registers the key exchange key in the SHE according to the key registration message,
   wherein, in the second transmission step, the first arithmetic processing device causes a key registration message for registering a MAC key in a RAM_KEY key of the SHE to be generated using the key exchange key through the HSM and transmits the key registration message to the second in-vehicle computer, and wherein, in the MAC key registration step, the second arithmetic processing device registers the MAC key in the SHE according to the key registration message.

4. An in-vehicle computer system provided in a vehicle, the in-vehicle computer system comprising:
a first in-vehicle computer including a first arithmetic processing device, a hardware security module (HSM), and a first storage; and
a second in-vehicle computer including a second arithmetic processing device, a secure hardware extension (SHE), and a second storage,
wherein the first in-vehicle computer and the second in-vehicle computer are connected to a communication network provided in the vehicle,
wherein an initial key is set to a KEY_N key usable in a generation process and a verification process for a message authentication code in the SHE,
wherein a master key is stored in the HSM, the master key being used together with an identifier of the second in-vehicle computer for generating the message authentication code to be used as the initial key,
wherein the first arithmetic processing device is configured to cause the message authentication code for the identifier of the second in-vehicle computer received from the second in-vehicle computer to be generated using the master key through the HSM,
wherein the first arithmetic processing device is further configured to execute a process of authenticating validity of the second in-vehicle computer by using the generated message authentication code,
wherein the first arithmetic processing device is further configured to cause a MASTER_ECU_KEY (MEK) key of the SHE to be generated using the master key through the HSM,
wherein the first arithmetic processing device is further configured to cause a key registration message for registering a key exchange key in another KEY_N key usable in an encryption process and a decryption process of the SHE or the KEY_N key usable in the generation process and the verification process for the message authentication code of the SHE to be generated using the MEK key through the HSM and transmit the key registration message to the second in-vehicle computer,
wherein the second arithmetic processing device is configured to register the key exchange key in the SHE according to the key registration message,
wherein the first arithmetic processing device is further configured to cause a key registration message for registering a message authentication code (MAC) key in a RAM_KEY key of the SHE to be generated using the key exchange key through the HSM and transmit the key registration message to the second in-vehicle computer, and
wherein the second arithmetic processing device is further configured to register the MAC key in the SHE according to the key registration message.

5. The in-vehicle computer system according to claim 4, wherein the second storage stores the key registration message for registering the MAC key in the RAM_KEY key of the SHE in a non-volatile memory,
wherein the second arithmetic processing device is further configured to register the MAC key in the SHE according to the key registration message stored in the non-volatile memory, and wherein the first in-vehicle computer and the second in-vehicle computer are further configured to execute a validity authentication process based on the MAC key registered in the RAM_KEY key of the SHE according to the key registration message stored in the non-volatile memory.

6. An in-vehicle computer system provided in a vehicle, the in-vehicle computer system comprising:
a first in-vehicle computer including a first arithmetic processing device, a first secure hardware extension (SHE), and a first storage; and
a second in-vehicle computer including a second arithmetic processing device, a second SHE, and a second storage,
wherein the first in-vehicle computer and the second in-vehicle computer are connected to a communication network provided in the vehicle,
wherein an initial key is set to a KEY_N key usable in a generation process and a verification process for a message authentication code in the second SHE,
wherein the first arithmetic processing device is configured to cause the message authentication code for an identifier of the second in-vehicle computer received from the second in-vehicle computer to be generated through a secure element storing a master key used together with the identifier of the second in-vehicle computer for generating the message authentication code to be used as the initial key,
wherein the first arithmetic processing device is further configured to cause the secure element to execute a process of authenticating validity of the second in-vehicle computer using the generated message authentication code,
wherein the first arithmetic processing device is further configured to cause a MASTER_ECU_KEY (MEK) key of the second SHE to be generated using the master key through the secure element,
wherein the first arithmetic processing device is further configured to cause a key registration message for registering a key exchange key in another KEY_N key usable in an encryption process and a decryption process of the second SHE or the KEY_N key usable in the generation process and the verification process for the message authentication code of the second SHE to be generated using the MEK key through the secure element and transmit the key registration message to the second in-vehicle computer,
wherein the second arithmetic processing device is configured to register the key exchange key in the second SHE according to the key registration message,
wherein the first arithmetic processing device is further configured to cause a key registration message for registering a message authentication code (MAC) key in a RAM_KEY key of the second SHE to be generated using the key exchange key through the first SHE and transmit the key registration message to the second in-vehicle computer, and
wherein the second arithmetic processing device is further configured to register the MAC key in the second SHE according to the key registration message.

7. An in-vehicle computer system provided in a vehicle, the in-vehicle computer system comprising:
a first in-vehicle computer including a first arithmetic processing device, a hardware security module (HSM), and a first storage; and a second in-vehicle computer including a second arithmetic processing device, a secure hardware extension (SHE), and a second storage, wherein the first in-vehicle computer and the second in-vehicle computer are connected to a communication network provided in the vehicle, wherein an initial key is set to a KEY_N key usable in a generation process and a verification process for a message authentication code in the SHE, wherein the first arithmetic processing device is configured to cause the message authentication code for an identifier of the second in-vehicle computer received from the second in-vehicle computer to be generated through a secure element storing a master key used together with the identifier of the second in-vehicle computer for generating the message authentication code to be used as the initial key, wherein the first arithmetic processing device is further configured to cause the secure element to execute a process of authenticating validity of the second in-vehicle computer using the generated message authentication code, wherein the first arithmetic processing device is further configured to cause a MASTER_ECU_KEY (MEK) key of the SHE to be generated using the master key through the secure element, wherein the first arithmetic processing device is further configured to cause a key registration message for registering a key exchange key in another KEY_N key usable in an encryption process and a decryption process of the SHE or the KEY_N key usable in the generation process and the verification process for the message authentication code of the SHE to be generated using the MEK key through the secure element and transmit the key registration message to the second in-vehicle computer, wherein the second arithmetic processing device is configured to register the key exchange key in the SHE according to the key registration message, wherein the first arithmetic processing device is further configured to cause a key registration message for registering a message authentication code (MAC) key in a RAM_KEY key of the SHE to be generated using the key exchange key through the HSM and transmit the key registration message to the second in-vehicle computer, and wherein the second arithmetic processing device is further configured to register the MAC key in the SHE according to the key registration message.

8. A vehicle comprising the in-vehicle computer system according to claim 1.

9. A management method for use in an in-vehicle computer system provided in a vehicle, the management method comprising:
   a message authentication code generation step;
   an authentication step;
   a MASTER_ECU_KEY (MEK) key generation step;
   a first transmission step;
   a key exchange key registration step;
   a second transmission step; and
   a message authentication code (MAC) key registration step,
   wherein the in-vehicle computer system includes:
      a first in-vehicle computer including a first arithmetic processing device, a first secure hardware extension (SHE), and a first storage; and
      a second in-vehicle computer including a second arithmetic processing device, a second SHE, and a second storage, wherein the first in-vehicle computer and the second in-vehicle computer are connected to a communication network provided in the vehicle, wherein an initial key is set to a KEY_N key usable in a generation process and a verification process for a message authentication code in the second SHE, wherein a master key is set to a KEY_N key usable in the generation process and the verification process for the message authentication code in the first SHE, the master key being used together with an identifier of the second in-vehicle computer for generating the message authentication code to be used as the initial key, wherein, in the message authentication code generation step, the first arithmetic processing device causes the message authentication code for the identifier of the second in-vehicle computer received from the second in-vehicle computer to be generated using the master key through the first SHE, wherein, in the authentication step, the first arithmetic processing device executes a process of authenticating validity of the second in-vehicle computer by using the generated message authentication code, wherein, in the MEK key generation step, the first arithmetic processing device causes a MEM key of the second SHE to be generated using the master key through the first SHE, wherein, in the first transmission step, the first arithmetic processing device causes a key registration message for registering a key exchange key in another KEY_N key usable in an encryption process and a decryption process of the second SHE or the KEY_N key usable in the generation process and the verification process for the message authentication code of the second SHE to be generated using the MEK key through the first SHE and transmits the key registration message to the second in-vehicle computer, wherein, in the key exchange key registration step, the second arithmetic processing device registers the key exchange key in the second SHE according to the key registration message, wherein, in the second transmission step, the first arithmetic processing device causes a key registration message for registering a MAC key in a RAM_KEY key of the second SHE to be generated using the key exchange key through the first SHE and transmits the key registration message to the second in-vehicle computer, and wherein, in the MAC key registration step, the second arithmetic processing device registers the MAC key in the second SHE according to the key registration message.

10. A management method for use in an in-vehicle computer system provided in a vehicle, the management method comprising:
   a message authentication code generation step;
   an authentication step;
   a MASTER_ECU_KEY (MEK) key generation step;
   a first transmission step;
   a key exchange key registration step;
   a second transmission step; and
   a message authentication code (MAC) key registration step, wherein the in-vehicle computer system includes:
a first in-vehicle computer including a first arithmetic processing device, a hardware security module (HSM), and a first storage; and
a second in-vehicle computer including a second arithmetic processing device, a secure hardware extension (SHE), and a second storage,
wherein the first in-vehicle computer and the second in-vehicle computer are connected to a communication network provided in the vehicle,
wherein an initial key is set to a KEY_N key usable in a generation process and a verification process for a message authentication code in the SHE,
wherein a master key is stored in the HSM, the master key being used together with an identifier of the second in-vehicle computer for generating the message authentication code to be used as the initial key,
wherein, in the message authentication code generation step, the first arithmetic processing device causes the message authentication code for the identifier of the second in-vehicle computer received from the second in-vehicle computer to be generated using the master key through the HSM,
wherein, in the authentication step, the first arithmetic processing device executes a process of authenticating validity of the second in-vehicle computer by using the generated message authentication code,
wherein, in the MEK key generation step, the first arithmetic processing device causes a MEK key of the SHE to be generated using the master key through the HSM,
wherein, in the first transmission step, the first arithmetic processing device causes a key registration message for registering a key exchange key in another KEY_N key usable in an encryption process and a decryption process of the SHE or the KEY_N key usable in the generation process and the verification process for the message authentication code of the SHE to be generated using the MEK key through the HSM and transmits the key registration message to the second in-vehicle computer,
wherein, in the key exchange key registration step, the second arithmetic processing device registers the key exchange key in the SHE according to the key registration message,
wherein, in the second transmission step, the first arithmetic processing device causes a key registration message for registering a message authentication code (MAC) key in a RAM_KEY key of the SHE to be generated using the key exchange key through the HSM and transmits the key registration message to the second in-vehicle computer, and
wherein, in the MAC key registration step, the second arithmetic processing device registers the MAC key in the SHE according to the key registration message.

11. A management method for use in an in-vehicle computer system provided in a vehicle, the management method comprising:
a message authentication code generation step;
an authentication step;
a MASTER_ECU_KEY (MEK) key generation step;
a first transmission step;
a key exchange key registration step;
a second transmission step; and
a message authentication code (MAC) key registration step, wherein the in-vehicle computer system includes:
a first in-vehicle computer including a first arithmetic processing device, a first secure hardware extension (SHE), and a first storage; and
a second in-vehicle computer including a second arithmetic processing device, a second SHE, and a second storage,
wherein the first in-vehicle computer and the second in-vehicle computer are connected to a communication network provided in the vehicle,
wherein an initial key is set to a KEY_N key usable in a generation process and a verification process for a message authentication code in the second SHE,
wherein, in the message authentication code generation step, the first arithmetic processing device causes the message authentication code for an identifier of the second in-vehicle computer received from the second in-vehicle computer to be generated through a secure element storing a master key used together with the identifier of the second in-vehicle computer for generating the message authentication code to be used as the initial key,
wherein, in the authentication step, the first arithmetic processing device causes the secure element to execute a process of authenticating validity of the second in-vehicle computer using the generated message authentication code,
wherein, in the MEK key generation step, the first arithmetic processing device causes a MEK key of the second SHE to be generated using the master key through the secure element,
wherein, in the first transmission step, the first arithmetic processing device causes a key registration message for registering a key exchange key in another KEY_N key usable in an encryption process and a decryption process of the second SHE or the KEY_N key usable in the generation process and the verification process for the message authentication code of the second SHE to be generated using the MEK key through the secure element and transmits the key registration message to the second in-vehicle computer,
wherein, in the key exchange key registration step, the second arithmetic processing device registers the key exchange key in the second SHE according to the key registration message,
wherein, in the second transmission step, the first arithmetic processing device causes a key registration message for registering a MAC key in a RAM_KEY key of the second SHE to be generated using the key exchange key through the first SHE and transmits the key registration message to the second in-vehicle computer, and
wherein, in the MAC key registration step the second arithmetic processing device registers the MAC key in the second SHE according to the key registration message.

12. A non-transitory computer-readable recording medium having a computer program for causing a computer serving as a first arithmetic processing device of an in-vehicle computer system provided in a vehicle to execute:
a message authentication code generation step;
an authentication step;
a MASTER_ECU_KEY (MEK) key generation step;
a first transmission step;
a key exchange key registration step;
a second transmission step; and
a message authentication code (MAC) key registration step, wherein the in-vehicle computer system includes:
a first in-vehicle computer including the first arithmetic processing device, a first secure hardware extension (SHE), and a first storage; and
a second in-vehicle computer including a second arithmetic processing device, a second SHE, and a second storage,
wherein the first in-vehicle computer and the second in-vehicle computer are connected to a communication network provided in the vehicle,
wherein an initial key is set to a KEY_N key usable in a generation process and a verification process for a message authentication code in the second SHE,
wherein a master key is set to a KEY_N key usable in the generation process and the verification process for the message authentication code in the first SHE, the master key being used together with an identifier of the second in-vehicle computer for generating the message authentication code to be used as the initial key,
wherein, in the message authentication code generation step, the first arithmetic processing device causes the message authentication code for the identifier of the second in-vehicle computer received from the second in-vehicle computer to be generated using the master key through the first SHE,
wherein, in the authentication step, the first arithmetic processing device executes a process of authenticating validity of the second in-vehicle computer by using the generated message authentication code,
wherein, in the MEK key generation step, the first arithmetic processing device causes a MEM key of the second SHE to be generated using the master key through the first SHE,
wherein, in the first transmission step, the first arithmetic processing device causes a key registration message for registering a key exchange key in another KEY_N key usable in an encryption process and a decryption process of the second SHE or the KEY_N key usable in the generation process and the verification process for the message authentication code of the second SHE to be generated using the MEK key through the first SHE and transmits the key registration message to the second in-vehicle computer,
wherein, in the key exchange key registration step, the second arithmetic processing device registers the key exchange key in the second SHE according to the key registration message,
wherein, in the second transmission step, the first arithmetic processing device causes a key registration message for registering a MAC key in a RAM_KEY key of the second SHE to be generated using the key exchange key through the first SHE and transmits the key registration message to the second in-vehicle computer, and
wherein, in the MAC key registration step, the second arithmetic processing device registers the MAC key in the second SHE according to the key registration message.

13. A non-transitory computer-readable recording medium having a computer program for causing a computer serving as a first arithmetic processing device of an in-vehicle computer system provided in a vehicle to execute:
a message authentication code generation step;
an authentication step;
a MASTER_ECU_KEY (MEK) key generation step;
a first transmission step;
a key exchange key registration step;
a second transmission step; and
a message authentication code (MAC) key registration step,
wherein the in-vehicle computer system includes:
a first in-vehicle computer including the first arithmetic processing device, a hardware security module (HSM), and a first storage; and
a second in-vehicle computer including a second arithmetic processing device, a secure hardware extension (SHE), and a second storage,
wherein the first in-vehicle computer and the second in-vehicle computer are connected to a communication network provided in the vehicle,
wherein an initial key is set to a KEY_N key usable in a generation process and a verification process for a message authentication code in the SHE,
wherein a master key is stored in the HSM, the master key being used together with an identifier of the second in-vehicle computer for generating the message authentication code to be used as the initial key,
wherein, in the message authentication code generation step, the first arithmetic processing device causes the message authentication code for the identifier of the second in-vehicle computer received from the second in-vehicle computer to be generated using the master key through the HSM,
wherein, in the authentication step, the first arithmetic processing device executes a process of authenticating validity of the second in-vehicle computer by using the generated message authentication code,
wherein, in the MEK key generation step, the first arithmetic processing device causes a MEK key of the SHE to be generated using the master key through the HSM,
wherein, in the first transmission step, the first arithmetic processing device causes a key registration message for registering a key exchange key in another KEY_N key usable in an encryption process and a decryption process of the SHE or the KEY_N key usable in the generation process and the verification process for the message authentication code of the SHE to be generated using the MEK key through the HSM and transmits the key registration message to the second in-vehicle computer,
wherein, in the key exchange key registration step, the second arithmetic processing device registers the key exchange key in the SHE according to the key registration message,
wherein, in the second transmission step, the first arithmetic processing device causes a key registration message for registering a message authentication code (MAC) key in a RAM_KEY key of the SHE to be generated using the key exchange key through the HSM and transmits the key registration message to the second in-vehicle computer, and
wherein, in the MAC key registration step, the second arithmetic processing device registers the MAC key in the SHE according to the key registration message.

14. A non-transitory computer-readable recording medium having a computer program for causing a computer serving as a first arithmetic processing device of an in-vehicle computer system provided in a vehicle to execute:
a message authentication code generation step;
an authentication step;
a MASTER_ECU_KEY (MEK) key generation step;
a first transmission step;
a key exchange key registration step;
a second transmission step; and a message authentication code (MAC) key registration step, wherein the in-vehicle computer system includes:
 a first in-vehicle computer including the first arithmetic processing device, a first secure hardware extension (SHE), and a first storage; and
 a second in-vehicle computer including a second arithmetic processing device, a second SHE, and a second storage, wherein the first in-vehicle computer and the second in-vehicle computer are connected to a communication network provided in the vehicle, wherein an initial key is set to a KEY_N key usable in a generation process and a verification process for a message authentication code in the second SHE, wherein, in the message authentication code generation step, the first arithmetic processing device causes the message authentication code for an identifier of the second in-vehicle computer received from the second in-vehicle computer to be generated through a secure element storing a master key used together with the identifier of the second in-vehicle computer for generating the message authentication code to be used as the initial key, wherein, in the authentication step, the first arithmetic processing device causes the secure element to execute a process of authenticating validity of the second in-vehicle computer using the generated message authentication code, wherein, in the MEK key generation step, the first arithmetic processing device causes a MEK key of the second SHE to be generated using the master key through the secure element, wherein, in the first transmission step, the first arithmetic processing device causes a key registration message for registering a key exchange key in another KEY_N key usable in an encryption process and a decryption process of the second SHE or the KEY_N key usable in the generation process and the verification process for the message authentication code of the second SHE to be generated using the MEK key through the secure element and transmits the key registration message to the second in-vehicle computer, wherein, in the key exchange key registration step, the second arithmetic processing device registers the key exchange key in the second SHE according to the key registration message, wherein, in the second transmission step, the first arithmetic processing device causes a key registration message for registering a MAC key in a RAM_KEY key of the second SHE to be generated using the key exchange key through the first SHE and transmits the key registration message to the second in-vehicle computer, and wherein, in the MAC key registration step the second arithmetic processing device registers the MAC key in the second SHE according to the key registration message.

15. A non-transitory computer-readable recording having a computer program for causing a computer serving as a first arithmetic processing device of an in-vehicle computer system provided in a vehicle to execute:

a message authentication code generation step;
an authentication step;
a MASTER_ECU_KEY (MEK) key generation step;
a first transmission step;
a key exchange key registration step;
a second transmission step; and
a message authentication code (MAC) key registration step, wherein the in-vehicle computer system includes:
 a first in-vehicle computer including the first arithmetic processing device, a hardware security module (HSM), and a first storage; and
 a second in-vehicle computer including a second arithmetic processing device, a secure hardware extension (SHE), and a second storage, wherein the first in-vehicle computer and the second in-vehicle computer are connected to a communication network provided in the vehicle, wherein an initial key is set to a KEY_N key usable in a generation process and a verification process for a message authentication code in the SHE, wherein, in the message authentication code generation step, the first arithmetic processing device causes the message authentication code for an identifier of the second in-vehicle computer received from the second in-vehicle computer to be generated through a secure element storing a master key used together with the identifier of the second in-vehicle computer for generating the message authentication code to be used as the initial key, wherein, in the authentication step, the first arithmetic processing device causes the secure element to execute a process of authenticating validity of the second in-vehicle computer using the generated message authentication code, wherein, in the MEK key generation step, the first arithmetic processing device causes a MEK key of the SHE to be generated using the master key through the secure element, wherein, in the first transmission step, the first arithmetic processing device causes a key registration message for registering a key exchange key in another KEY_N key usable in an encryption process and a decryption process of the SHE or the KEY_N key usable in the generation process and the verification process for the message authentication code of the SHE to be generated using the MEK key through the secure element and transmits the key registration message to the second in-vehicle computer, wherein, in the key exchange key registration step, the second arithmetic processing device registers the key exchange key in the SHE according to the key registration message, wherein, in the second transmission step, the first arithmetic processing device causes a key registration message for registering a MAC key in a RAM_KEY key of the SHE to be generated using the key exchange key through the HSM and transmits the key registration message to the second in-vehicle computer, and wherein, in the MAC key registration step, the second arithmetic processing device registers the MAC key in the SHE according to the key registration message.

* * * * *